US012439316B2

(12) United States Patent
Li et al.

(10) Patent No.: US 12,439,316 B2
(45) Date of Patent: Oct. 7, 2025

(54) METHOD FOR COMMUNICATION AND RELATED PRODUCT

(71) Applicant: GUANGDONG OPPO MOBILE TELECOMMUNICATIONS CORP., LTD., Guangdong (CN)

(72) Inventors: Haitao Li, Guangdong (CN); Ning Yang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 432 days.

(21) Appl. No.: 17/935,087

(22) Filed: Sep. 24, 2022

(65) Prior Publication Data
US 2023/0016688 A1    Jan. 19, 2023

Related U.S. Application Data

(63) Continuation of application No. PCT/CN2020/082211, filed on Mar. 30, 2020.

(51) Int. Cl.
*H04W 36/08* (2009.01)
*H04W 36/00* (2009.01)
*H04W 36/30* (2009.01)
*H04W 36/36* (2009.01)

(52) U.S. Cl.
CPC ..... *H04W 36/305* (2018.08); *H04W 36/0069* (2018.08); *H04W 36/08* (2013.01); *H04W 36/362* (2023.05)

(58) Field of Classification Search
None
See application file for complete search history.

(56) References Cited

U.S. PATENT DOCUMENTS 12,149,993 B2 * 11/2024 Xu .................. H04W 36/00837
2019/0246442 A1    8/2019 Park et al.
2021/0136606 A1 *  5/2021 Jia ........................ H04W 56/00

FOREIGN PATENT DOCUMENTS

CN    106332114    1/2017
CN    109982347    7/2019

OTHER PUBLICATIONS

Futurewei, "Handling of multiple candidate cells for CPAC," 3GPP TSG-RAN WG2 Meeting #108, R2-1914986, Nov. 2019.
Futurewei, "Failure and validation handling on intra-SN CPC," 3GPP TSG-RAN WG2 Meeting #109e, R2-2000446, Feb. 2020.
WIPO, International Search Report and Written Opinion for International Application No. PCT/CN2020/082211, Dec. 17, 2020.
(Continued)

*Primary Examiner* — Willie J Daniel, Jr.
(74) *Attorney, Agent, or Firm* — Hodgson Russ LLP

(57) ABSTRACT

A method for communication and related devices are provided in the disclosure. The method includes the following. A terminal device determines a failure of access to a target primary secondary cell (PSCell) or a radio link failure (RLF) after the target PSCell is accessed. The terminal device transmits a secondary cell group (SCG) failure report to a first network node, where the SCG failure report includes first indication information, and the first indication information indicates type information of PSCell addition/change.

20 Claims, 13 Drawing Sheets

(56) References Cited

OTHER PUBLICATIONS

LG Electronics INC, "SCG Failure Handling with Conditional PSCell Configuration," 3GPP TSG-RAN WG2 Meeting #108, R2-1916207, Nov. 2019.
Potevio, "Considerations on failure handling for CPAC in NR," 3GPP TSG-RAN WG2 Meeting #108, R2-1915915, Nov. 2019.
EPO, Extended European Search Report for EP Application No. 20929258.0, Mar. 29, 2023.

\* cited by examiner

METHOD FOR COMMUNICATION AND RELATED PRODUCT

CROSS-REFERENCE TO RELATED APPLICATION(S)

This application is a continuation of International Application No. PCT/CN2020/082211, filed Mar. 30, 2020, the entire disclosure of which is incorporated herein by reference.

TECHNICAL FIELD

The disclosure relates to the technical field of communication, and more particularly to a method for communication and related products.

BACKGROUND

In mobile communication, for improving data throughput of devices, a dual-connectivity (DC) communication system is introduced. According to the system, throughput of a terminal device that has been accessed to a primary cell (PCell) and is in a connected state can be increased, and also extra frequency spectrum resources can be allocated to the terminal device by using a cell in a secondary base station. In the DC communication system such as a DC-technology-based $5^{th}$ generation (5G) (or called new radio (NR)) system, primary secondary cell (PSCell) addition/change is often involved. However, when a terminal device accesses to an added or changed PSCell, an access failure or a radio link failure (RLF) after access may occur, however, for these failures, a network side is unable to perform reliable adjustment to reduce occurrence of these failures.

SUMMARY

A method for communication and related products are provided in implementations of the disclosure.

In a first aspect, a method for communication is provided in implementations of the disclosure. The method includes the following. A terminal device determines a failure of access to a target PSCell or an RLF after the target PSCell is accessed. The terminal device transmits a secondary cell group (SCG) failure report to a first network node, where the SCG failure report includes first indication information, and the first indication information indicates type information of PSCell addition/change.

In a second aspect, a terminal device is provided in implementations of the disclosure. The terminal device includes a transceiver, a processor, and a memory storing computer programs. The computer programs which, when executed by the processor, cause the processor to determine a failure of access to a target PSCell or an RLF after the target PSCell is accessed. The computer programs are further executed by the processor to cause the transceiver to transmit an SCG failure report to a first network node, where the SCG failure report includes first indication information, and the first indication information indicates type information of PSCell addition/change.

In a third aspect, a network device is provided in implementations of the disclosure. The network device includes a transceiver, a processor, and a memory storing computer programs. The computer programs which, when executed by the processor, cause the transceiver to receive an SCG failure report transmitted by a terminal device, where the SCG failure report includes first indication information, and the first indication information indicates type information of PSCell addition/change. The computer programs are further executed by the processor to cause the processor to modify information for triggering PSCell addition/change according to the SCG failure report.

BRIEF DESCRIPTION OF THE DRAWINGS

The following will give an introduction to the accompanying drawings used for illustrating implementations or the related art.

DETAILED DESCRIPTION

The following will illustrate technical solutions of implementations of the disclosure in conjunction with the accompanying drawings of implementations of the disclosure.

Before introducing in detail methods for communication provided in implementations of the disclosure, first briefly introduce terms and a communication system involved in implementations of the disclosure.

Figure 1A:
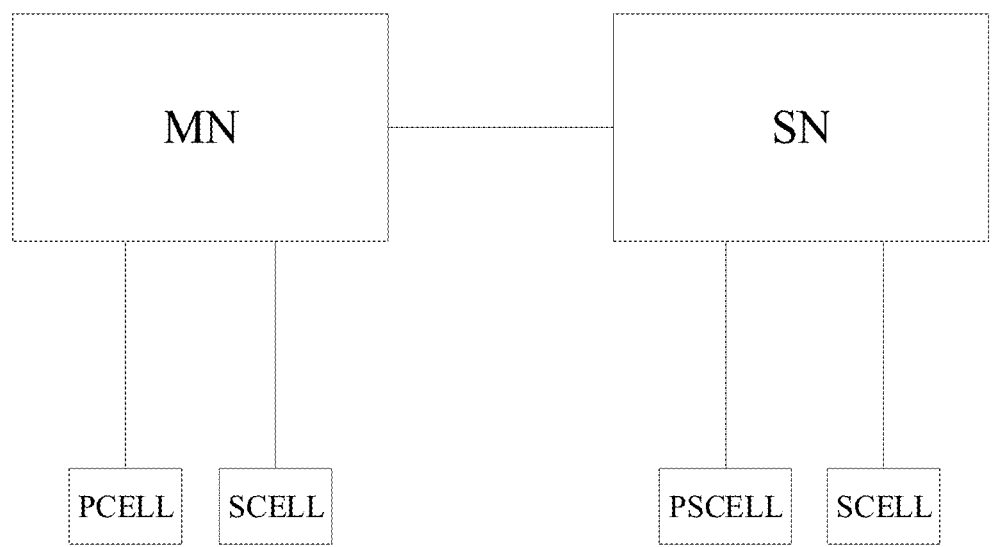
FIG. 1A is a schematic diagram illustrating a dual-connectivity (DC) architecture provided in implementations of the disclosure.

Dual-connectivity (DC) technology is an important technology introduced in the 3$^{rd}$ generation partnership project (3GPP). A terminal device supporting DC can be simultaneously connected with two base stations, thereby providing a higher rate for a user and increasing throughput of a single user, and thus realizing better coverage and improving a resource utilization rate. Referring to FIG. 1A, FIG. 1A is a schematic diagram illustrating a DC architecture provided in implementations of the disclosure. As illustrated in FIG. 1A, the system includes a master node (MN), a secondary node (SN), a primary cell (PCell) in the MN, a secondary cell (SCell) in the MN, a PCell in the SN, i.e., a primary secondary cell (PSCell), and a SCell in the SN, and a terminal device can be simultaneously connected with a cell in the MN and a cell in the SN.

In the DC technology, PSCell addition/change for an SN, which is also called SN addition/change, is introduced. The PSCell addition/change is further classified as conventional PSCell addition/change and conditional PSCell addition/change (CPAC). The following will briefly illustrate solutions of the conventional PSCell addition/change and the CPAC.

Figure 1B:
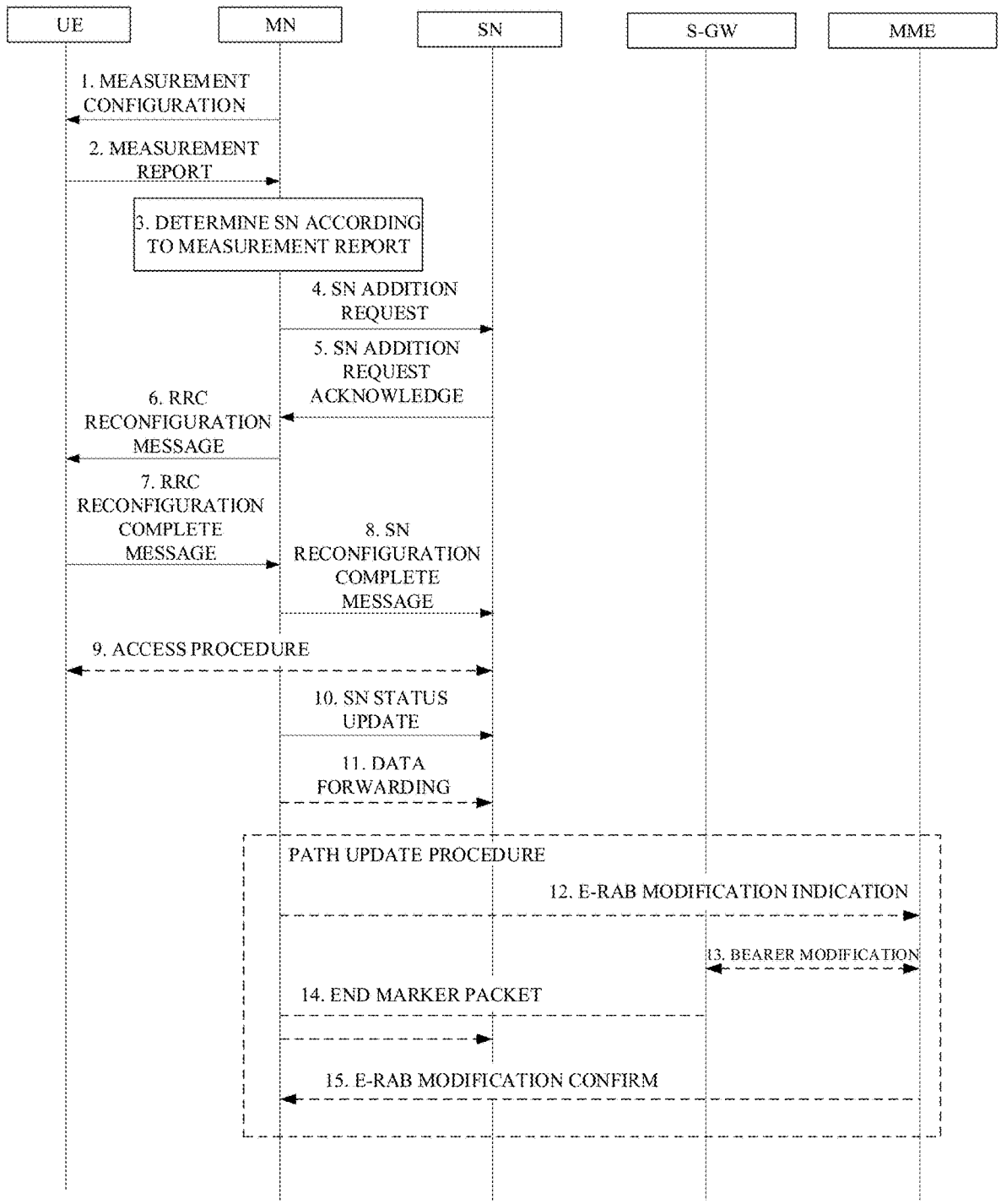
FIG. 1B is a schematic diagram illustrating conventional primary secondary cell (PSCell) addition provided in implementations of the disclosure.

As an example, referring to FIG. 1B, FIG. 1B is a schematic diagram illustrating conventional PSCell addition provided in the disclosure. As illustrated in FIG. 1B, the conventional PSCell addition can include the following.

1. An MN transmits a measurement configuration (information) to a terminal device, where the measurement configuration may include an air-interface frequency, a measurement reporting event, etc.
2. The terminal device performs measurement according to the measurement configuration, and if a corresponding condition in the measurement reporting event is met, reports a corresponding measurement report.
3. The MN determines a target SN (i.e., an SN which a target PSCell belongs to) according to the measurement report of a PSCell reported by the terminal device.
4. The MN transmits an SN addition request (e.g., a secondary gNodeB (SgNB) addition request) to the SN and requests related resource allocation.
5. After receiving the request, the SN transmits an addition request acknowledge message (e.g., SgNB addition request acknowledge) to the MN.
6-7. Upon receiving a radio resource control (RRC) reconfiguration message (e.g., an RRC connection reconfiguration) transmitted by the MN, the terminal device performs reconfiguration, and transmits a reconfiguration complete message (e.g., RRC connection reconfiguration complete) to the MN.
8. On the premise that the SN allocates resources successfully, the MN transmits an SN reconfiguration complete message (e.g., SgNB reconfiguration complete) to the SN.
9. The terminal device initiates an access procedure (e.g., a random access procedure) to the SN.
10-11. SN status updates (e.g., SN status transfer) and perform data forwarding.
12-15. Furthermore, the terminal device can initiate a path update procedure, and completes user plane path update according to corresponding indications.

For conditional PSCell addition, an MN pre-communicates with one or more candidate target SNs and transmits reserved resources to a terminal device. When a measurement result of a certain measurement object in multiple measurement objects (or measurement targets) measured by the terminal device meets a corresponding condition-trigger (cond-trigger) configuration (or called a condition, a triggering condition, etc.), the terminal device can add a PSCell corresponding to the measurement object that meets the condition.

Figure 1C:
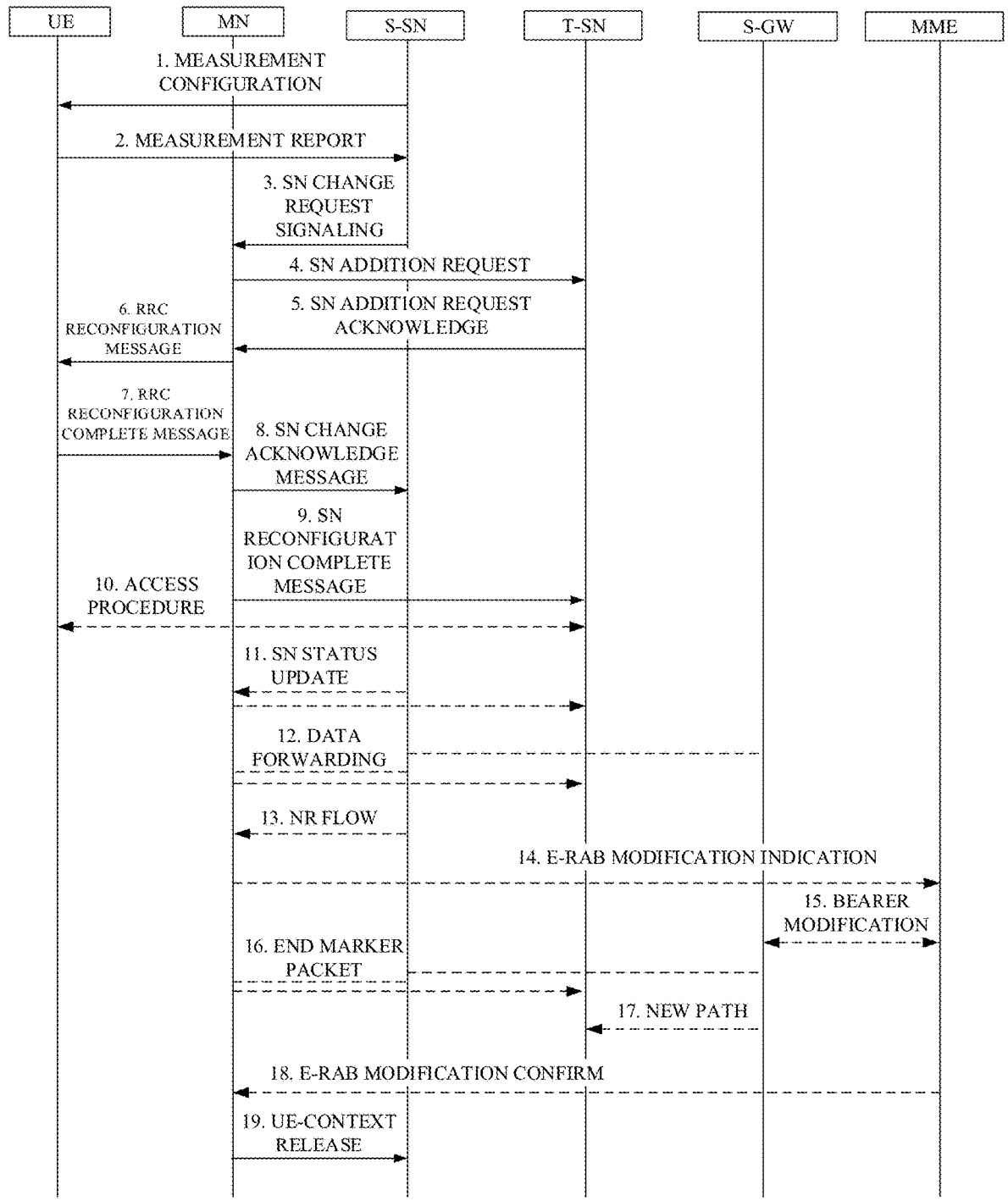
FIG. 1C is a schematic diagram illustrating conventional PSCell change provided in implementations of the disclosure.

PSCell change includes two cases where one is that an MN triggers SN change and the other is that an SN triggers SN change, where a difference between the two cases lies in an executor that initiates change. For the former, an MN directly initiates an addition request to a target SN, and for the latter, a source SN transmits a change request to an MN first. That is to say, for the former, related configuration information for change is configured by an MN, and for the latter, related configuration information for change is configured by an SN. As illustrated in FIG. 1C, FIG. 1C is a schematic diagram illustrating conventional PSCell change provided in the disclosure, where the procedure is that an SN triggers SN change. Exemplarily, as illustrated in FIG. 1C, the procedure can include the following.

1. A source SN transmits a measurement configuration to a terminal device, where the measurement configuration may include an air-interface frequency, a measurement reporting event, etc.
2. The terminal device performs measurement according to the measurement configuration, and if a corresponding condition in the measurement reporting event is met, reports a corresponding measurement report to the source SN.
3. The source SN sends SN change request signaling to an MN to trigger an SN change procedure, where the signaling may carry the measurement report, such that the MN can determine a target SN for the terminal device.
4-5. The MN transmits to a target SN a target SN addition request, to request the target SN to allocate resources to the terminal device, and the target SN receives the request and returns a corresponding acknowledge message.
6-7. Upon receiving an RRC reconfiguration message transmitted by the MN, the terminal device performs reconfiguration and transmits a reconfiguration complete message to the MN.
8. If the target SN allocates resources successfully, the MN determines release of resources for the source SN and transmits an SN change acknowledge message to the source SN.
9. If the RRC reconfiguration is completed, the MN determines that the reconfiguration is completed by transmitting an SN reconfiguration complete message to the target SN.
10. The terminal device initiates an access procedure to the target SN.
11-12. SN status updates and perform data forwarding.
13. The source SN reports a new radio (NR) flow to the MN.
14-18. User plane path update is completed according to corresponding indications.
19. When the source SN receives a terminal-device-context release message, the source SN releases terminal-device context.

Figure 1D:
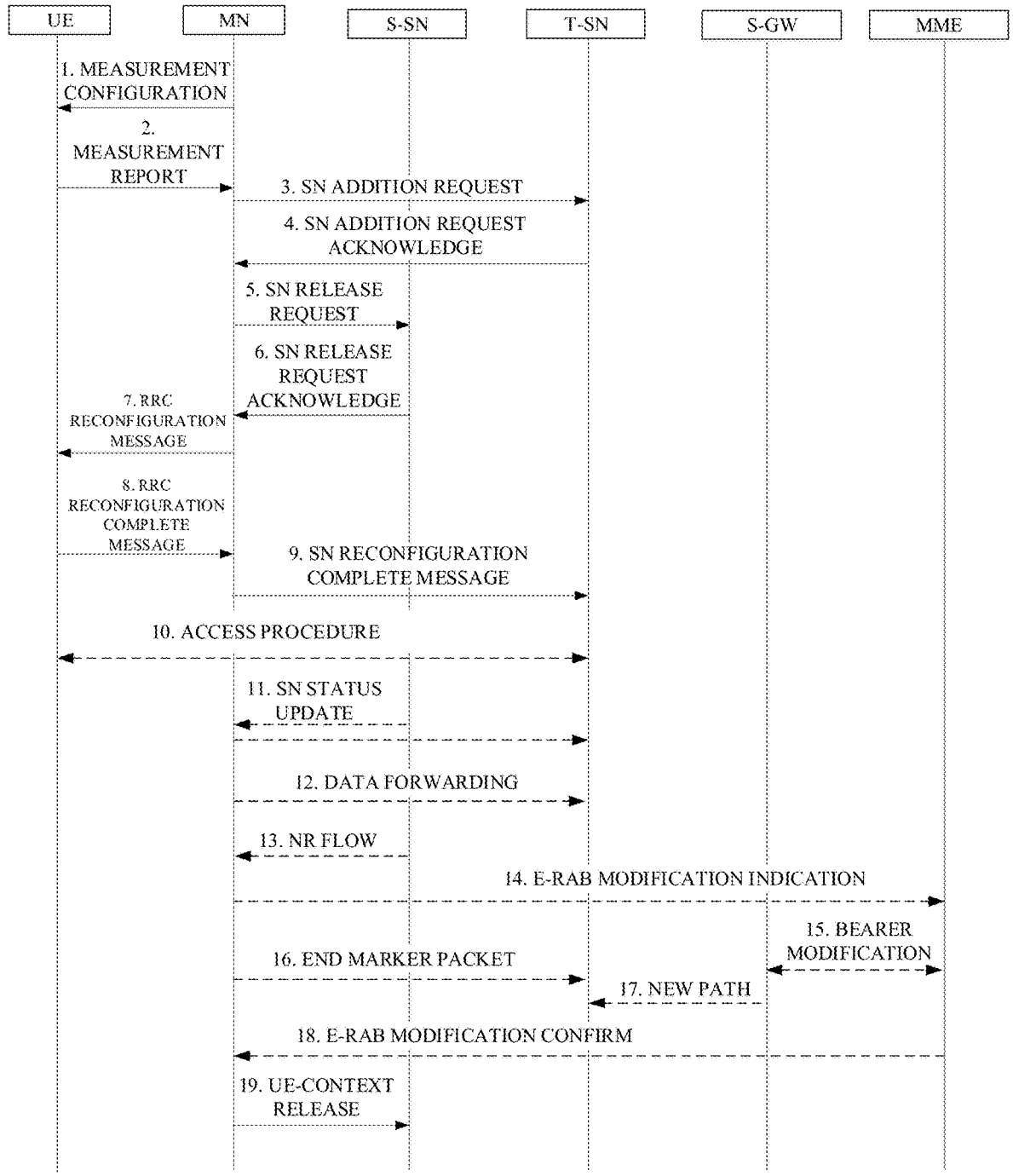
FIG. 1D is another schematic diagram illustrating conventional PSCell change provided in implementations of the disclosure.

As illustrated in FIG. 1D, FIG. 1D is another schematic diagram illustrating conventional PSCell change provided in the disclosure. Exemplarily, as illustrated in FIG. 1D, a case that an MN triggers SN change can include the following.

1. An MN transmits a measurement configuration to a terminal device.

2. The terminal device performs measurement according to the measurement configuration, and if a corresponding condition in the measurement reporting event is met, reports a corresponding measurement report to the MN.
3-4. The MN transmits to a target SN a target SN addition request, to request the target SN to allocate resources to the terminal device, and the target SN receives the request and returns a corresponding acknowledge message.
5-6. The MN transmits a release request to a source SN, and the source SN returns a release request acknowledge message.
7-8. The MN transmits an RRC reconfiguration message to the terminal device, and the terminal device transmits a reconfiguration complete message to the MN.
9. If the RRC reconfiguration is completed, the MN determines that the reconfiguration is completed by transmitting an SN reconfiguration complete message to the target SN.
10. The terminal device initiates an access procedure to the target SN.
11-12. SN status updates and perform data forwarding.
13. The source SN reports an NR flow to the MN.
14-18. User plane path update is completed according to corresponding indications.
19. When the source SN receives a terminal-device-context release message, the source SN releases terminal-device context.

Correspondingly, for conditional PSCell change, an MN pre-communicates with one or more candidate target SNs and transmits reserved resources to the terminal device. During change, if a measurement result of a measurement object measured by the terminal device meets a corresponding con-trigger configuration, access to a PSCell corresponding to the measurement object that meets the condition can be initiated, and a source SN is changed to a target SN corresponding to the PSCell.

For conventional PSCell addition or conventional PSCell change, or conditional PSCell addition or conditional PSCell change, after successful PSCell addition or PSCell change, when the terminal device accesses to a PSCell, an access failure or an RLF after the PSCell is accessed may occur. In the disclosure, when an access failure or an RLF occurs, the terminal device can report failure information such as an SCG failure report to the network side such as an MN or an SN, and thus the network side can perform targeted modification on information for triggering PSCell addition/change, according to failure information such as a type of PSCell addition/change, thereby improving an access reliability and reducing occurrence of failures. The following will illustrate in detail in conjunction with a system architecture.

Figure 1E:
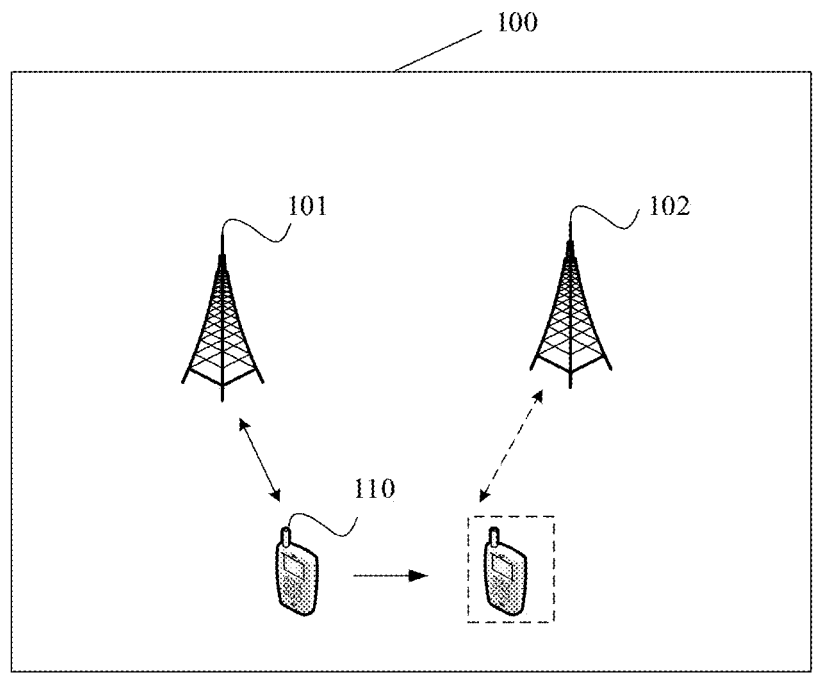
FIG. 1E is an architectural diagram illustrating a communication system provided in implementations of the disclosure.

Referring to FIG. 1E, FIG. 1E is an architectural diagram illustrating a communication system provided in implementations of the disclosure. As illustrated in FIG. 1E, the communication system 100 may include at least one network node, such as a first network node 101 and a second network node 102, and a terminal device, such as a terminal device 110.

In the disclosure, the network node may be a base station, such as a NodeB (NB), an evolved NodeB (eNB), and a next generation (NG) NodeB (gNB). For example, the first network node is a master eNB (MeNB), and the second network node is a secondary eNB (SeNB). For another example, the first network node is a master gNB (MgNB), and the second network node is a secondary gNB (SgNB). The terminal device may also be called an access terminal, a subscriber unit, a subscriber station, a mobile station, a mobile platform, a remote station, a remote terminal, a mobile device, a user terminal, a terminal, a user equipment (UE), a wireless communication device, a user agent or a user apparatus, a cellular radio telephone, a cordless telephone, a session initiation protocol (SIP) telephone, a wireless local loop (WLL) station, a personal digital assistant (PDA), or a terminal device in a $5^{th}$ generation (5G) network or a future evolved network, which will not be limited herein.

As illustrated in FIG. 1E, the terminal device 110 is connected with the first network node 101. With movement of the terminal device 110, when the terminal device 110 is moved into an area where the terminal device 110 can be simultaneously connected with the first network node 101 and the second network node 102, the terminal device 110 can perform DC with the first network node and the second network node, thereby realizing communication with the first network node and the second network node. The first network node 101 can be assigned as an MN, and the second network node can be assigned as an SN. The second network node connected may be an SN added or may also be a target SN changed from a source SN. That is, one case is that during movement of the terminal device 110, the terminal device 110 accesses to a PSCell corresponding to a second network node 102 (an SN) newly added, and the other case is that the terminal device 110 is connected with a PSCell corresponding to a source second network node (a source SN), and with movement of the terminal device, network node access of the terminal device is changed from the second network node to a new target second network node (a target SN), and the terminal device 110 accesses to a PSCell corresponding to the target SN, at this point, the source SN may release an original connection.

In a procedure that the terminal device 110 accesses to a PSCell corresponding to the second network node 102, an access failure may occur, for example, an access failure may occur because of radio link interruption, access timeout, etc. In this case, if the terminal device 110 determines a failure of access to the PSCell, the terminal device 110 can report an SCG failure report to the first network node (an MN) or the second network node (e.g., a source SN), which is conducive for the network side to adjust information for triggering PSCell addition/change for the terminal device, e.g., adjust a signal threshold triggering condition for PSCell addition/change, to improve a reliability of adjustment on the information for triggering PSCell addition/change by the network side, thereby improving an access reliability of the terminal device and reducing occurrence of a failure of access to a PSCell.

In the disclosure, the SCG failure report may also be called SCG failure information, failure indication information, indication information, or other names, which will not be limited herein.

Figure 2:
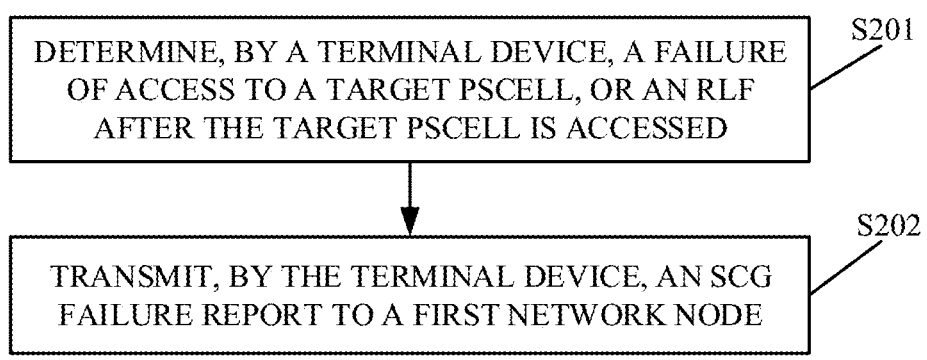
FIG. 2 is a flow chart illustrating a method for communication provided in implementations of the disclosure.

Referring to FIG. 2, FIG. 2 is a flow chart illustrating a method for communication provided in implementations of the disclosure. The method is illustrated from a perspective of a terminal device side, and the procedure includes the following.

At S201, the terminal device determines a failure of access to a target PSCell, or an RLF after the target PSCell is accessed.

The target PSCell may be a PSCell in an SN corresponding to PSCell addition, e.g., a PSCell corresponding to conventional PSCell addition or a PSCell corresponding to conditional PSCell addition. The target PSCell may also be a PSCell in a target SN corresponding to PSCell change, e.g., a PSCell corresponding to conventional PSCell change or a PSCell corresponding to conditional PSCell change. For PSCell addition/change, when the terminal device accesses to the target PSCell corresponding to PSCell addition/change, there may exist an access failure or an RLF (the following can uniformly take the access failure as an example for illustration).

At S202, the terminal device transmits an SCG failure report to a first network node.

If the terminal device determines the failure of access to the target PSCell or the RLF, the terminal device can transmit the SCG failure report to the first network node. The SCG failure report includes first indication information, and the first indication information indicates type information of PSCell addition/change.

Optionally, the type information of PSCell addition/change may be a type of conventional PSCell addition/change, a type of non-conventional PSCell addition/change such as a type of CPAC, indication information indicating whether the type of PSCell addition/change is the type of non-conventional PSCell addition/change such as the type of CPAC, or indication information indicating whether the type of PSCell addition/change is the type of conventional PSCell addition/change. That is to say, in the disclosure, the type of PSCell addition/change can be explicitly or implicitly indicated according to the first indication information.

In a possible implementation, the SCG failure report may further include second indication information, and the second indication information may indicate information for triggering PSCell addition/change, e.g., indicates a measurement object for triggering CPAC and a cond-trigger configuration corresponding to the measurement object, or a measurement object for triggering conventional PSCell addition/change and a report configuration corresponding to the measurement object. The second indication information can explicitly or implicitly indicate the information for triggering PSCell addition/change.

For example, the second indication information may include a measurement identity (ID), where the measurement ID may indicate a related measurement object and a related cond-trigger configuration, e.g., indicate a measurement object for triggering CPAC and a cond-trigger configuration corresponding to the measurement object, for example, the cond-trigger configuration corresponding to the measurement object is a cond-trigger configuration met by a measurement result obtained according to the measurement object. For another example, the second indication information may include a measurement object ID and a condition-trigger configuration ID (cond-trigger configID), where the measurement object ID may indicate a related measurement object, e.g., indicate the measurement object for triggering PSCell addition/change, and the cond-trigger configID may indicate a related cond-trigger configuration, e.g., indicate the cond-trigger configuration corresponding to the measurement object. The measurement object may include frequency information, time location information, a sub-carrier spacing, or the like that is measured, e.g., a frequency, a time location, or a sub-carrier spacing of a reference signal measured. For example, the measurement object may be a frequency. The cond-trigger configuration corresponding to the measurement object may include an event configured, a signal threshold corresponding to the event, etc. For example, the event may be event A3, event A4, or event A5. Exemplarily, event A3 refers to that a quality of an intra-frequency/inter-frequency neighboring cell is higher than that of a serving cell, event A4 refers to that a quality of an inter-frequency neighboring cell is higher than a certain threshold, and event A5 refers to that a quality of a serving cell is lower than a certain threshold and a quality of a neighboring cell is higher than a certain threshold. Those are several exemplary event types, and other event types may also be included, which will not be listed herein.

In a possible implementation, if the first indication information indicates that the type of PSCell addition/change is the type of non-conventional PSCell addition/change such as the type of CPAC, the SCG failure report further includes second indication information, and the second indication information indicates information for triggering CPAC. Optionally, the second indication information includes a measurement ID, where the measurement ID indicates a measurement object for triggering CPAC and a cond-trigger configuration corresponding to the measurement object. Alternatively, the second indication information includes a measurement object ID and a cond-trigger configID, where the measurement object ID indicates the measurement object for triggering CPAC, and the cond-trigger configID indicates the cond-trigger configuration corresponding to the measurement object. That is to say, for non-conventional PSCell addition/change such as CPAC, the first indication information and the second indication information can be carried in the SCG report, while for conventional PSCell addition/change, only the first indication information can be carried in the SCG failure report.

In a possible implementation, after the terminal device transmits the SCG failure report to the network side, the terminal device can also receive second configuration information transmitted by the network side such as the first network node or the second network node. The second configuration information may indicate modified information for triggering the PSCell addition/change, e.g., modified threshold information. After the terminal device receives the second configuration information, i.e., a new triggering condition, the terminal device can re-access to the target PSCell according to the second configuration information.

In a possible implementation, the SCG failure report further includes third indication information, where the third indication information may indicate a configuration source for configuring CPAC, and the configuration source is the first network node, a second network node, a PCell in an MN, or a current serving PSCell in an SN. In the DC system, the first network node is the MN, and the second network node is the SN.

In a possible implementation, the SCG failure report may also include any one or more of: a cause of the failure of access to the target PSCell by the terminal device or a cause of the RLF after the terminal device accesses to the target PSCell, geographic location information or movement track information of the failure of access to the target PSCell by the terminal device, or measurement information of the terminal device. The cause may include a bad quality of radio link resulted in the RLF, timeout when the terminal device accesses to the target PSCell, a random access problem when the terminal device accesses to the target PSCell, etc. The geographic location information/movement track information of the failure of access to the target PSCell by the terminal device may include a track experienced by the terminal device before the terminal device fails to access to the target PSCell, i.e., which cells are involved in connection and disconnection with the terminal device. The geographic location information may include location information or area information where the terminal device is located when the terminal device fails to access the target PSCell. The measurement information may include frequency information such as frequencies of the target PSCell and neighboring cells.

According to the above implementations, if the terminal device determines the failure of access to the target PSCell or the RLF after the target PSCell is accessed, the terminal device can transmit to the first network node the SCG failure report including the first indication information, to indicate a type of PSCell addition/change according to the first indication information, such that the network side can correspondingly adjust the information for triggering PSCell addition/change according to the SCG failure report, thereby improving a reliability of adjustment, and thus improving an access reliability and reducing occurrence of an access failure.

Figure 3:
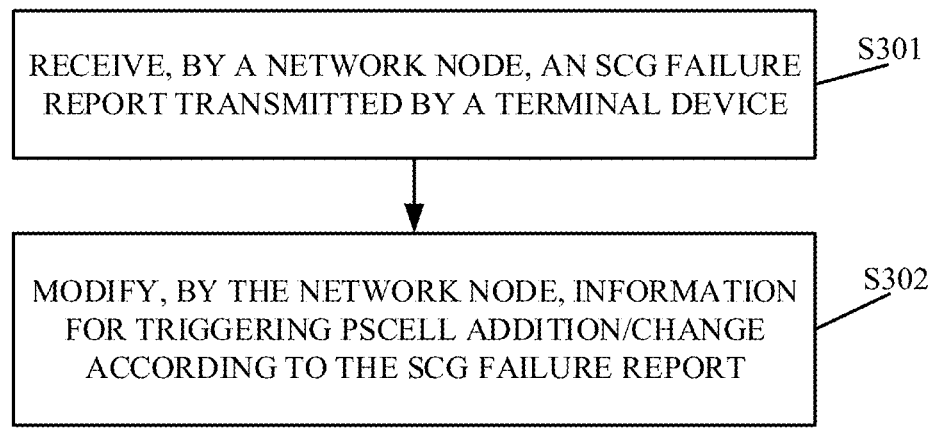
FIG. 3 is another flow chart illustrating a method for communication provided in implementations of the disclosure.

Referring to FIG. 3, FIG. 3 is another flow chart illustrating a method for communication provided in implementations of the disclosure. The flow chart is illustrated from a perspective of a network side, and the method includes the following.

At S301, a network node receives an SCG failure report transmitted by a terminal device.

The SCG failure report may include first indication information, and the first indication information may indicate type information of PSCell addition/change. The type of PSCell addition/change includes a type of CPAC and a type of conventional PSCell addition/change. The first indication information can explicitly or implicitly indicate the type of PSCell addition/change.

In a possible implementation, the SCG failure report may further include second indication information, and the second indication information may indicate information for triggering PSCell addition/change, e.g., indicates a related measurement object and a related cond-trigger configuration, or a measurement object for triggering CPAC and a cond-trigger configuration corresponding to the measurement object. The second indication information can explicitly or implicitly indicate the information for triggering PSCell addition/change.

In a possible implementation, if the first indication information indicates that the type of PSCell addition/change is a type of non-conventional PSCell addition/change such as the type of CPAC, the SCG failure report further includes second indication information, and the second indication information indicates information for triggering CPAC. That is to say, for CPAC, the first indication information and the second indication information can be carried in the SCG report, while for conventional PSCell addition/change, only the first indication information can be carried in the SCG report.

In a possible implementation, the SCG failure report may also include any one or more of: a cause of the failure of access to the target PSCell by the terminal device or a cause of the RLF after the terminal device accesses to the target PSCell, geographic location information or movement track information of the failure of access to the target PSCell by the terminal device, or measurement information of the terminal device.

It can be understood that for illustration of the type information, the first indication information, the second indication information, and the cause, reference can be made to the related illustration in the above implementations, which will not be repeated herein.

At S302, the network node modifies information for triggering PSCell addition/change according to the SCG failure report.

Optionally, when the network node modifies the information for triggering PSCell addition/change according to the SCG failure report, for the conditional type, threshold information of an event corresponding to the cond-trigger configuration may be modified, and for the conventional type, threshold information of an event corresponding to the report configuration may be modified.

In a possible implementation, after the operations at S302, the network node can also transmit second configuration information to the terminal device, where the second configuration information indicates modified information for triggering CPAC. For example, the second indication information may indicate a modified cond-trigger configuration or modified threshold information.

In a possible implementation, the SCG failure report may further include third indication information, the third indication information may indicate a configuration source of configuration information. If the configuration source is indicated as a second network node, e.g., a source SN, after the first network node such as an MN receives the SCG failure report transmitted by the terminal device, the first network node can also forward the SCG failure report to the source SN, and the source SN receives the SCG failure report. Since the source SN has already disconnected from the terminal device and released resources to avoid resource waste due to occupation of the resources, the terminal device cannot directly transmit the SCG failure report to the source SN.

According to the above implementations, the network node can receive the SCG failure report including the first indication information transmitted by the terminal device, where the first indication information indicates the type of PSCell addition/change, furthermore, the network node can correspondingly adjust the information for triggering PSCell addition/change according to the type indicated by the first indication information, thereby improving a reliability of adjustment, and thus improving an access reliability of the terminal device and reducing occurrence of an access failure or an RLF.

Figure 4:
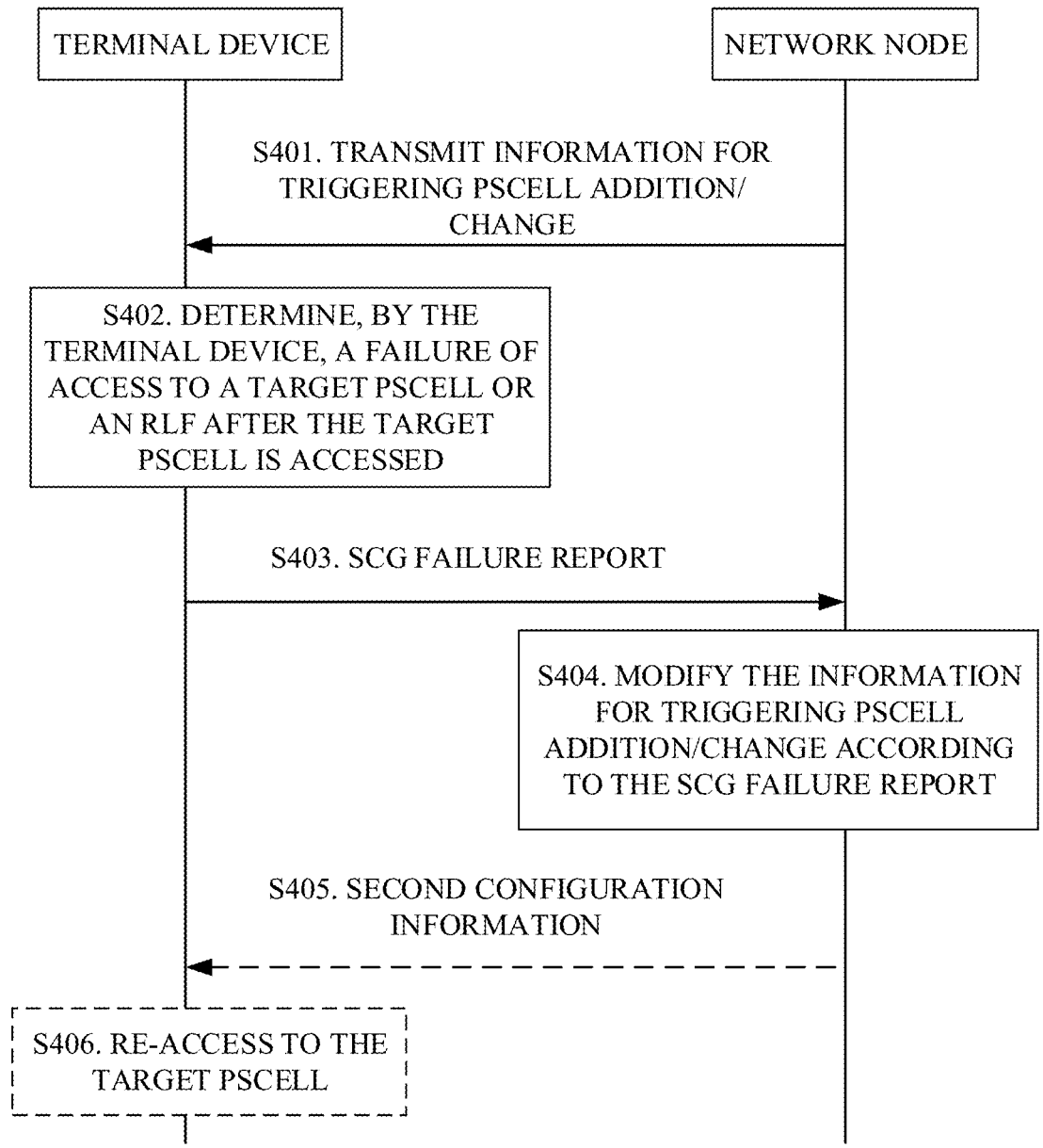
FIG. 4 is yet another flow chart illustrating a method for communication provided in implementations of the disclosure.

Referring to FIG. 4, FIG. 4 is yet another flow chart illustrating a method for communication provided in implementations of the disclosure. As illustrated in FIG. 4, the method includes the following.

At S401, a network node transmits to a terminal device information for triggering PSCell addition/change.

The network node can configure for the terminal device the information for triggering PSCell addition/change, where the information for triggering PSCell addition/change includes information for triggering conventional PSCell addition/change and/or information for triggering CPAC. For example, the network node can configure first configuration information, where the first configuration information may indicate information for triggering CPAC, e.g., indicate a measurement object for triggering CPAC and a cond-trigger configuration corresponding to the measurement object. Alternatively, the first configuration information may indicate information for triggering CPAC and information for triggering conventional PSCell addition/change. Alternatively, the network node can configure first configuration information and third configuration information, where the first configuration information indicates the information for triggering CPAC, and the third configuration information indicates the information for triggering conventional PSCell addition/change. Furthermore, the network node can transmit configured information to the terminal device.

In a possible implementation, the network node can transmit the first configuration information to the terminal device, and the terminal device can receive the first configuration information transmitted by the network node. The first configuration information may indicate the information for triggering CPAC, e.g., indicate at least one (one or more) measurement object and at least one cond-trigger configuration. Alternatively, the first configuration information indicates the information for triggering CPAC and the information for triggering conventional PSCell addition/change, e.g., indicates a measurement object and a report configuration. That is to say, the network side can indicate to the terminal device the information for triggering conventional PSCell addition/change and the information for triggering CPAC according to one piece of configuration information.

In a possible implementation, the network node can transmit the first configuration information and the third configuration information to the terminal device, and the terminal device can receive the first configuration information and the third configuration information transmitted by the network node. The first configuration information may indicate the measurement object for triggering CPAC and the cond-trigger configuration corresponding to the measurement object, and the third configuration information may indicate the measurement object for triggering conventional PSCell addition/change and the report configuration corresponding to the measurement object. That is to say, the network side can indicate to the terminal device the information for triggering conventional PSCell addition/change and the information for triggering CPAC according to different configuration information respectively.

Optionally, the above configuration information may include a measurement ID, or both a measurement object ID and a cond-trigger configID, or both a measurement ID and a report configuration ID (reportConfigID). Optionally, different cond-trigger configurations corresponding to different measurement objects can be the same or different, and one measurement object can correspond to one or more cond-trigger configurations.

For example, the first configuration information may include at least one measurement ID, where the measurement ID may indicate a specified measurement object and a specified cond-trigger configuration. Alternatively, the first configuration information may include at least one measurement object ID and at least one cond-trigger configID, where the measurement object ID indicates a measurement object, and the cond-trigger configID indicates a cond-trigger configuration.

For another example, the third configuration information may include at least one measurement ID, where the measurement ID may indicate a specified measurement object and a specified report configuration. Alternatively, the third configuration information may include at least one measurement object ID and at least one reportConfigID, where the measurement object ID indicates a measurement object, and the reportConfigID indicates a report configuration.

At S402, the terminal device determines a failure of access to a target PSCell or an RLF after the target PSCell is accessed.

At S403, the terminal device transmits an SCG failure report to the network node.

After configuration information is obtained, the terminal device can obtain a measurement result by measuring a measurement object. When the measurement result meets a cond-trigger configuration corresponding to the measurement object or a report configuration corresponding to the measurement object, the terminal device can determine a target PSCell to-be-accessed. For example, for conventional PSCell addition/change, when the measurement result meets the corresponding report configuration, i.e., a reporting condition, the terminal device can report a measurement report to a network node that configures measurement configuration information. The network node selects a corresponding SN and a corresponding PSCell for addition or change according to the measurement result, and the SN allocates access resources to the terminal device, which is conducive for the terminal device to access to the target PSCell. If the access fails, the terminal device can transmit an SCG failure report to the network node. For another example, for CPAC, the PSCell has already pre-allocated corresponding access resources to the terminal device, the terminal device can directly initiate an access request to a target PSCell related to the measurement object, and if the access fails, the terminal device can transmit an SCG failure report to the network node.

The SCG failure report may include first indication information, and the first indication information indicates a type of PSCell addition/change. Optionally, the SCG failure report may further include second indication information, and the second indication information indicates information for triggering PSCell addition/change. For example, if the first indication information indicates that the type of PSCell addition/change is CPAC, the SCG failure report may further include the second indication information, to indicate information for triggering CPAC. Optionally, the SCG failure report may further include third indication information, a failure cause, location information, or measurement information, and specific reference can be made to the related illustration in the foregoing implementations, which will not be repeated herein.

At S404, the network node modifies the information for triggering PSCell addition/change according to the SCG failure report.

In the disclosure, the network node for information modification can be in consistent with a network node for configuring and transmitting information for triggering PSCell addition/change.

At S405, the network node transmits second configuration information to the terminal device.

Optionally, after the network node modifies/adjusts the information for triggering PSCell addition/change, the network node can also transmit the second configuration information to the terminal device. The second configuration information may indicate modified information for triggering PSCell addition/change, e.g., modified signal threshold information.

At S406, the terminal device re-accesses to the target PSCell according to the second configuration information.

Furthermore, optionally, the terminal device can receive the second configuration information, and further access to the target PSCell according to the second configuration information such as an indicated signal threshold.

For example, supposing that information for triggering CPAC that the network side pre-configures for the terminal device is: a measurement object being frequency 1, a cond-trigger configuration being event A3, and a signal threshold being −60 dbm, the above information is indicated by a measurement ID 1. Supposing that configured information for triggering conventional PSCell addition/change is: a measurement object being frequency 1, a report configuration being event A3, and a signal threshold being −65 dbm, the above information is indicated by a measurement ID 2. Supposing that a measure result of the terminal device at frequency 1 meets a cond-trigger configuration corresponding to the conditional type, the terminal device tries to access to a target PSCell related to frequency 1. If the access fails, the terminal device transmits an SCG failure report including first indication information and second indication information. The first indication information indicates a type of CPAC, and the second indication information indicates the information for triggering CPAC, for example, the second indication information is the measurement ID 1. Furthermore, the network device can modify the signal threshold corresponding to the measurement ID 1 for the conditional type according to the first indication information and the measurement ID 1, and can also indicate to the terminal device the modified signal threshold. Therefore the terminal device can try to access to the target PSCell according to the modified signal threshold.

In the implementation, the network node can flexibly configure for the terminal device the information for triggering PSCell addition/change, such that when the terminal device fails to access to a corresponding PSCell, the terminal device can transmit the SCG failure report to the network node. As such, the network side can correspondingly adjust the information for triggering PSCell addition/change according to the SCG failure report, thereby improving a reliability of adjustment, and thus improving an access reliability and reducing occurrence of an access failure.

Figure 5A:
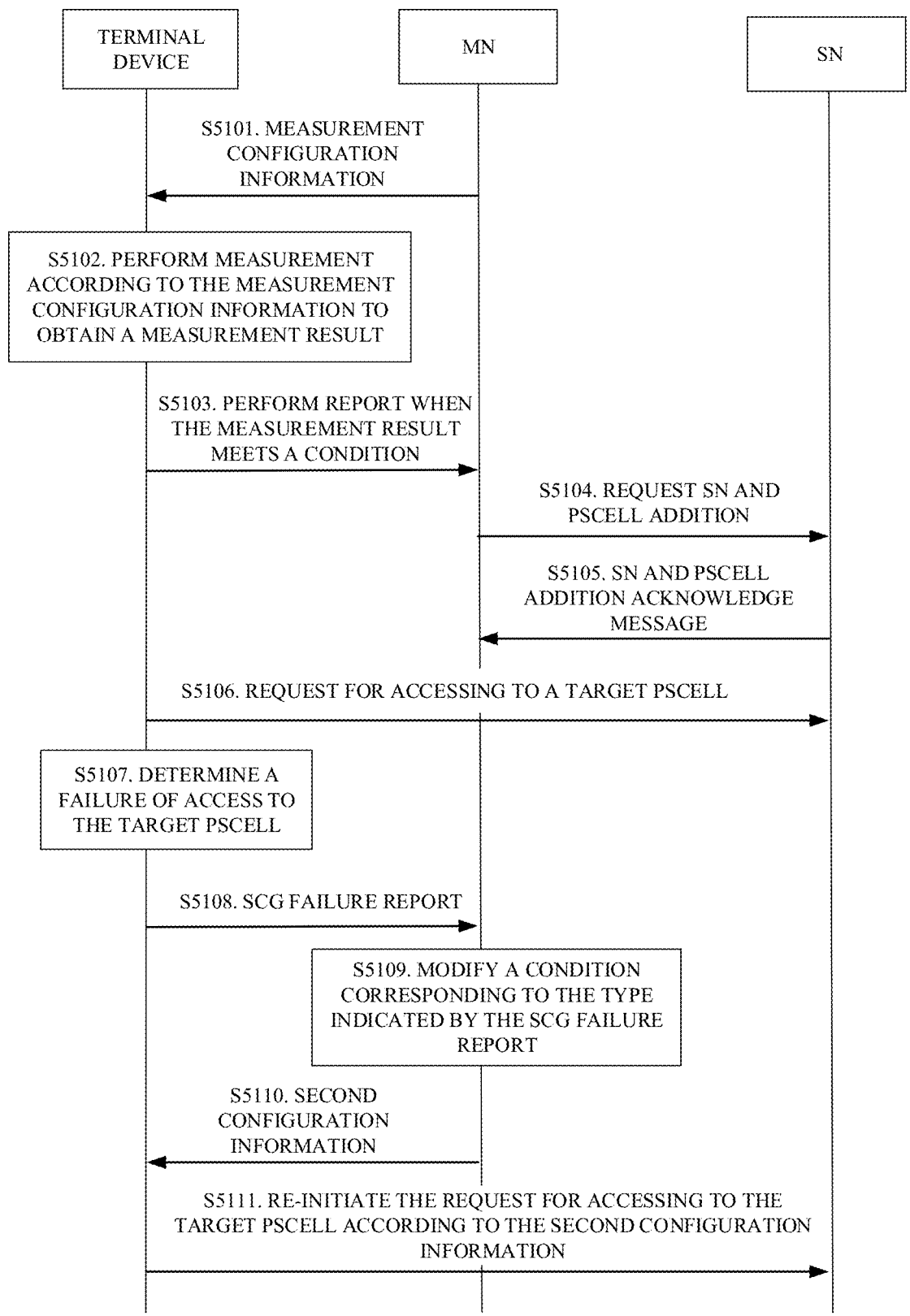
FIG. 5A is a flow chart illustrating a method for communication based on conventional PSCell addition provided in implementations of the disclosure.

Referring to FIG. 5A, FIG. 5A is a flow chart illustrating a method for communication based on conventional PSCell addition provided in implementations of the disclosure, where the method involves a terminal device, a first network node (an MN), and a second network node (an SN). In the implementation, the method is applied to conventional PSCell addition and includes the following.

At S5101, the MN transmits measurement configuration information to the terminal device.

The measurement configuration information indicates a measurement object for triggering conventional PSCell addition and a report configuration corresponding to the measurement object. Optionally, the measurement configuration information includes a measurement ID, where the measurement ID indicates a measurement object for triggering conventional PSCell addition and a report configuration corresponding to the measurement object. Alternatively, the measurement configuration information includes a measurement object ID and a reportConfigID, where the measurement object ID indicates the measurement object for triggering conventional PSCell addition, and the reportConfigID indicates the report configuration corresponding to the measurement object. For example, the measurement configuration information may be the above first configuration information or the above third configuration information.

Optionally, the measurement configuration information may also indicate information for triggering conventional PSCell change (can be the same as or different from the information for triggering conventional PSCell addition) and/or information for triggering CPAC. Alternatively, the MN can also transmit to the terminal device other configuration information for indicating the information for triggering CPAC, which will not be repeated herein.

At S5102, the terminal device performs measurement according to the measurement configuration information to obtain a measurement result.

Specifically, information such as a measurement frequency measured by the terminal device is indicated in the measurement configuration information.

At S5103, when the measurement result meets a condition, the terminal device reports the measurement result.

When the measurement result meets the condition, e.g., a measurement result obtained according to a measurement object meets a corresponding report configuration, the terminal device reports a measurement report, to determine a target SN.

At S5104, the MN requests SN and PSCell addition.

In a procedure that the first network node requests the SN and PSCell addition, the first network simultaneously initiates a request for allocating resources for the terminal device, and the terminal device further receives a resource-allocation success message.

At S5105, the SN returns an SN and PSCell addition acknowledge message to the MN.

The SN responds to the addition request and returns an addition success acknowledge message to the MN.

At S5106, the terminal device initiates a request for accessing to a target PSCell.

At S5107, the terminal device determines a failure of access to the target PSCell.

After addition or change of the target PSCell succeeds, the terminal device tries to access to the target PSCell, where a failure of access to a PSCell (or an RLF after the PSCell is accessed) is focused in the disclosure.

At S5108, the terminal device transmits an SCG failure report to the MN.

The SCG failure report includes first indication information, and the first indication information indicates type information of PSCell addition, where the type indicated herein is conventional PSCell addition. Optionally, the SCG failure report further includes second indication information, and the second indication information indicates information for triggering conventional PSCell addition. For example, in the implementation, the SCG failure report can carry only the first indication information and no second indication information, which is conducive to reducing signaling overhead.

At S5109, the MN modifies a condition corresponding to the type indicated by the SCG failure report.

After the MN receives the SCG failure report, the MN can determine the type of PSCell addition according to the first indication information, i.e., a type of conventional PSCell addition or a type of conventional PSCell addition/change. Furthermore, the MN can obtain triggering information corresponding to the type, i.e., obtain information for triggering conventional PSCell addition, and the MN can obtain second configuration information by adjusting the information. For example, the MN can obtain a report configuration corresponding to the measurement object and can further modify the report configuration such as a signal threshold in the report configuration. It can be understood that for the conventional type, since the network side configures for the terminal device only one type of measurement configuration for each time, the network side can know information such as a measurement object used by the terminal device side and a report configuration corresponding to the measurement object, and thus after the SCG failure report is received, the network side can obtain corresponding information for modification.

At S5110, the MN transmits the second configuration information to the terminal device.

The second configuration information may indicate modified information for triggering conventional PSCell addition/change.

At S5111, the terminal device re-initiates the request for accessing to the target PSCell according to the second configuration information.

According to the implementation, it specifically reflects that for conventional PSCell addition, when the terminal device fails to access to the target PSCell, the network node can modify the information for triggering conventional PSCell addition according to the indication of the terminal device, thereby improving a reliability of adjustment on the information for triggering conventional PSCell addition by the network side, and thus reducing occurrence of a failure of access to a PSCell.

Figure 5B:
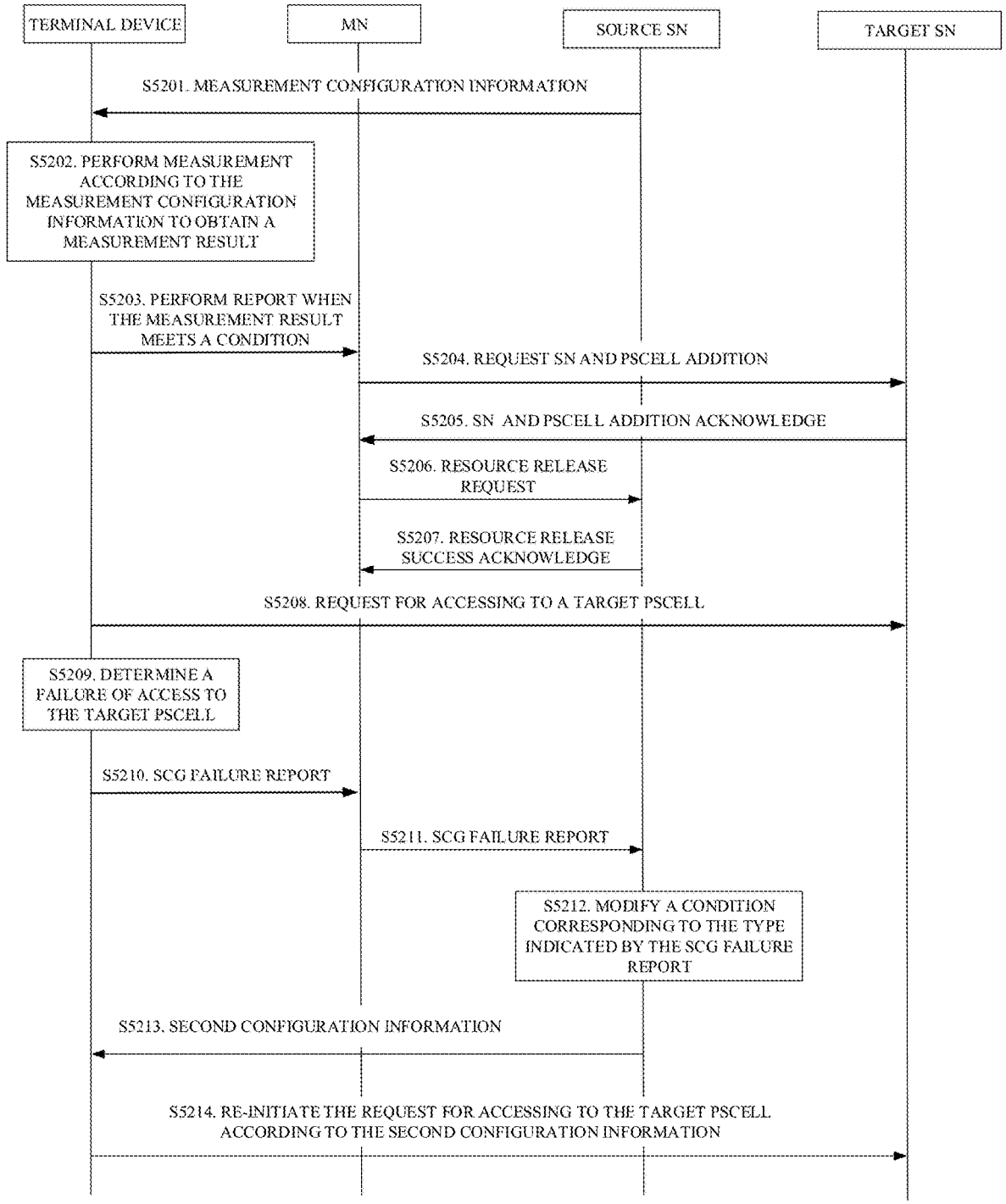
FIG. 5B is a flow chart illustrating a method for communication based on conventional PSCell change provided in implementations of the disclosure.

Referring to FIG. 5B, FIG. 5B is a flow chart illustrating a method for communication based on conventional PSCell change provided in implementations of the disclosure, where the method exemplarily illustrates that a source second network node (i.e., a source SN) configures information. The method can be executed by a terminal device, a first network node (an MN), the source second network node (the source SN), and a target second network node (a target SN). The method is applied to conventional PSCell change. That is, the source SN is connected with the terminal device, and according to movement of the terminal device, the terminal device is required to be updated to be connected with a new SN, i.e., the target SN. The method may include the following.

At S5201, the source SN transmits measurement configuration information to the terminal device.

The measurement configuration information indicates a measurement object for triggering conventional PSCell change and a report configuration corresponding to the measurement object. Optionally, the measurement configuration information includes a measurement ID, where the measurement ID indicates a measurement object for triggering conventional PSCell change and a report configuration corresponding to the measurement object. Alternatively, the measurement configuration information includes a measurement object ID and a reportConfigID, where the measurement object ID indicates the measurement object for triggering conventional PSCell change, and the reportConfigID indicates the report configuration corresponding to the measurement object.

At S5202, the terminal device performs measurement according to the measurement configuration information to obtain a measurement result.

At S5203, when the measurement result meets a condition, the terminal device reports the measurement result.

At S5204, the MN requests target SN and PSCell addition.

The addition herein means to modify the source SN to the target SN and add the target SN.

At S5205, the target SN returns a target SN and PSCell acknowledge message to the MN.

At 55206, the MN transmits a resource release request to the source SN.

The MN requests the source SN to release resources to save resources. During movement of the terminal device, the terminal device has already moved out of an area of the source SN, and thus release of access resources of the terminal device is a protection for resources.

At S5207, the source SN returns a resource-release acknowledge message to the source SN.

At S5208, the terminal device initiates a request for accessing to a target PSCell.

At S5209, the terminal device determines a failure of access to the target PSCell.

At S5210, the terminal device transmits an SCG failure report to the MN.

At S5211, the MN transmits the SCG failure report to the source SN.

In a combination of the operations at S5210 and the operations at S5211, because the terminal device has already disconnected from the source SN before the terminal device accesses to the target PSCell corresponding to the target SN, the report cannot be directly transmitted from the terminal device to the source SN, and thus the terminal device transmits the SCG failure report to the MN first, and then the MN forwards the SCG failure report to the source SN.

The SCG failure report includes first indication information, and the first indication information indicates type information of conventional PSCell change, where the type indicated is conventional PSCell change or conventional PSCell addition/change. Optionally, the SCG failure report further includes second indication information, and the second indication information indicates information for triggering conventional PSCell change. For example, in the implementation, the SCG failure report can carry only the first indication information and no second indication information, which is conducive to reducing signaling overhead.

At S5212, the source SN modifies a condition corresponding to the type indicated by the SCG failure report.

Optionally, after the source SN obtains the SCG failure report, the source SN can determine that a type of PSCell change is a conventional type according to the first indication information. Furthermore, the source SN can obtain information for triggering PSCell change corresponding to the conventional type, e.g., a corresponding report configuration, and then the source SN can modify the report configuration such as a signal threshold.

At S5213, the source SN transmits second configuration information to the terminal device.

Optionally, the source SN can transmit the second configuration information to the terminal device through the MN.

At S5214, the terminal device re-initiates the request for accessing to the target PSCell according to the second configuration information.

According to the implementation, it specifically reflects that for conventional PSCell change, when the terminal device fails to access to the target PSCell, the network node can modify the information for triggering conventional PSCell change according to the indication of the terminal device, thereby improving a reliability of adjustment on the information for triggering conventional PSCell change by the network side, and thus reducing occurrence of a failure of access to a PSCell.

Figure 6A:
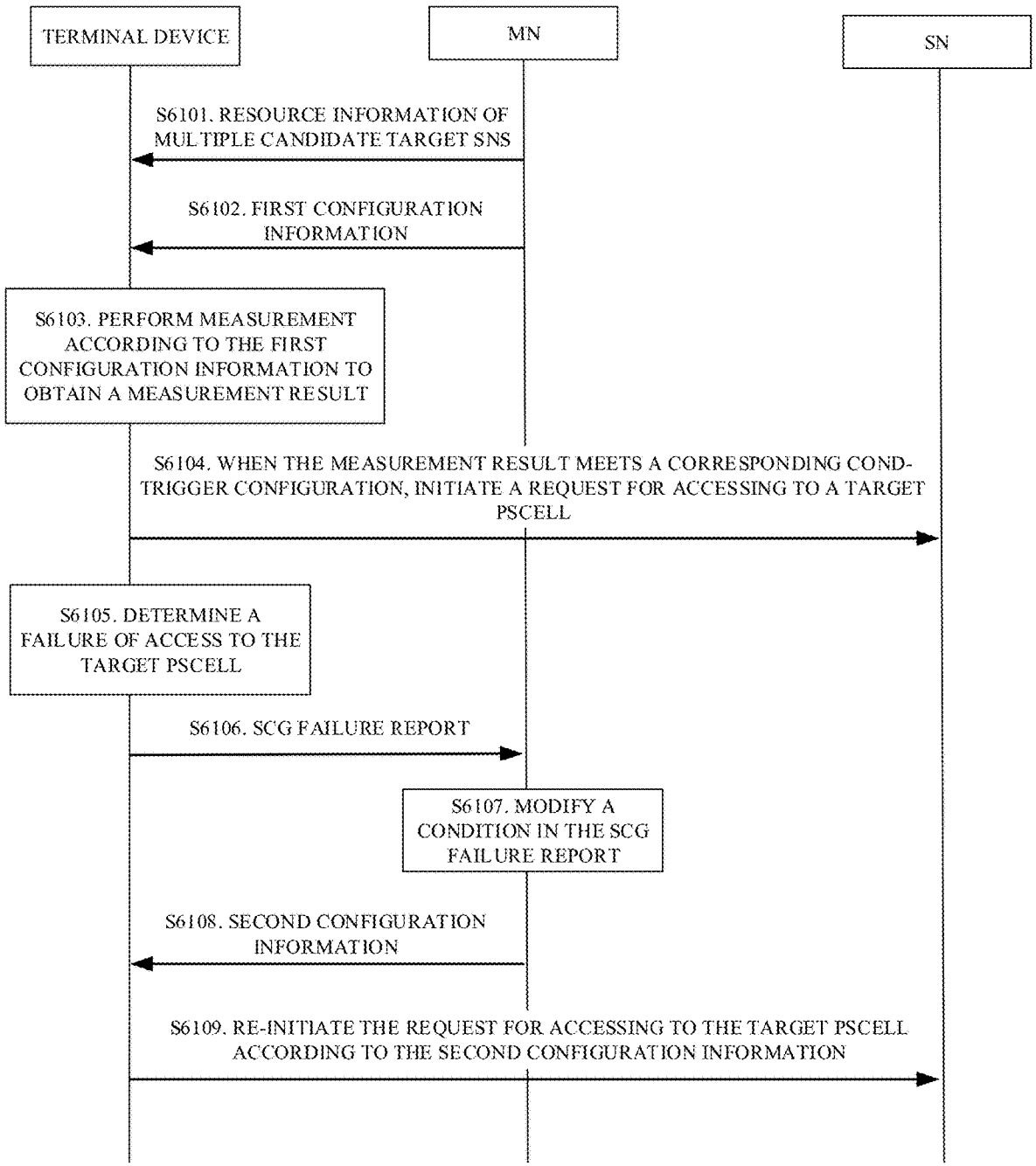
FIG. 6A is a flow chart illustrating a method for communication based on conditional PSCell addition provided in implementations of the disclosure.

Referring to FIG. 6A, FIG. 6A is a flow chart illustrating a method for communication based on conditional PSCell addition provided in implementations of the disclosure, where the method involves a terminal device, a first network node (an MN), and a second network node (an SN). The method exemplarily illustrates conditional PSCell addition and includes the following.

At S6101, the MN transmits to the terminal device resource information of multiple candidate target SNs.

According to the solution of conditional PSCell addition, the MN has already pre-communicated with multiple candidate target cells and successfully transmitted access resource information to the terminal device.

At S6102, the MN transmits first configuration information to the terminal device.

The first configuration information indicates at least one measurement object for triggering conditional PSCell addition and at least one cond-trigger configuration. Optionally, the first configuration information includes at least one measurement ID, where the measurement ID indicates a measurement object for triggering conditional PSCell addition and a cond-trigger configuration corresponding to the measurement object. Alternatively, the first configuration information includes at least one measurement object ID and at least one cond-trigger configID, where the measurement object ID indicates a measurement object, and the cond-trigger configID indicates a cond-trigger configuration. Optionally, the cond-trigger configuration corresponding to the measurement object may include multiple corresponding threshold information.

At S6103, the terminal device performs measurement according to the first configuration information to obtain a measurement result.

At 56104, when the measurement result meets a corresponding cond-trigger configuration, initiate a request for accessing to a target PSCell.

If a measurement result obtained by the terminal device according to one of the at least one measurement object meets one of the at least one cond-trigger configuration, the terminal device can initiate a request for accessing to a target PSCell related to the measurement object.

Optionally, when the measurement result meets the corresponding cond-trigger configuration, the MN can perform SN addition, and the SN can return an SN and PSCell addition acknowledge message to the MN.

At S6105, the terminal device determines a failure of access to the target PSCell.

At S6106, the terminal device transmits an SCG failure report to the MN.

The SCG failure report includes first indication information, and the first indication information indicates type information of conditional PSCell addition, where the type of PSCell addition indicated is conditional. The SCG failure report further includes second indication information, and the second indication information indicates information for triggering conditional PSCell addition. Optionally, the second indication information may include a measurement ID, where the measurement ID indicates a measurement object for triggering conditional PSCell addition and a cond-trigger configuration corresponding to the measurement object, e.g., a cond-trigger configuration met by a measurement result that is obtained according to the measurement object. Alternatively, the second configuration information may include a measurement object ID and a cond-trigger configID, where the measurement object ID indicates the measurement object for triggering conditional PSCell addition, and the cond-trigger configID indicates the cond-trigger configuration corresponding to the measurement object.

At S6107, the MN modifies a condition in the SCG failure report.

After the MN receives the SCG failure report, the MN can determine the type of PSCell addition according to the first indication information, i.e., a type of conditional PSCell addition or a type of conditional PSCell addition/change. Furthermore, the MN can obtain second configuration information through adjustment according to the second indication information. For example, the cond-trigger configuration such as a signal threshold in the cond-trigger configuration is modified, to obtain a modified signal threshold.

At S6108, the MN transmits the second configuration information to the terminal device.

The second configuration information may indicate modified information for triggering conditional PSCell addition/change.

At 56109, the terminal device re-initiates the request for accessing to the target PSCell according to the second configuration information.

According to the implementation, it specifically reflects that for conditional PSCell addition, when the terminal device fails to access to the target PSCell, the network node can modify the information for triggering conditional PSCell addition according to the first indication information and the second indication information of the terminal device, thereby improving a reliability of adjustment on the information for triggering conditional PSCell addition by the network side, and thus reducing occurrence of a failure of access to a PSCell.

Figure 6B:
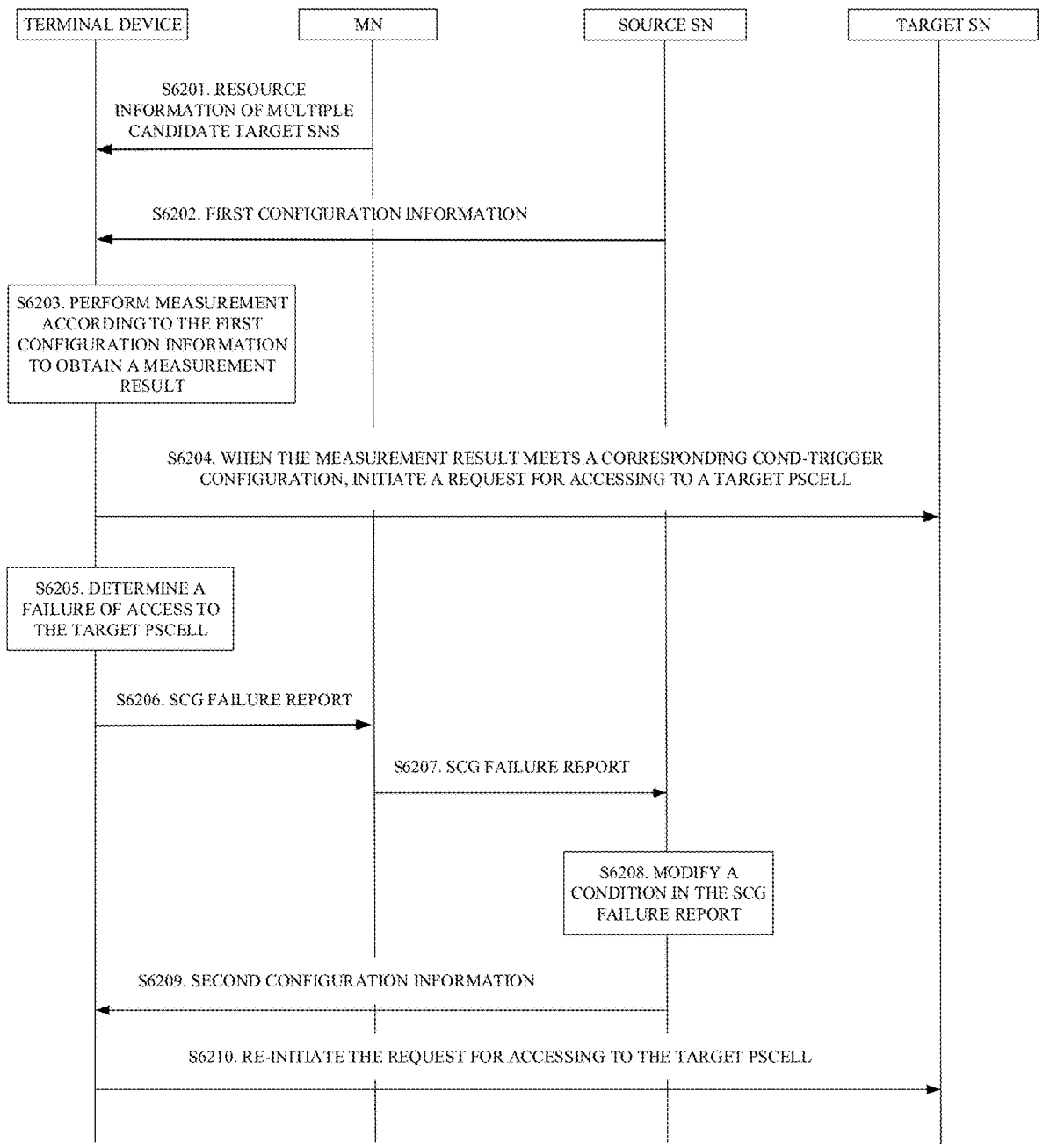
FIG. 6B is a flow chart illustrating a method for communication based on conditional PSCell change provided in implementations of the disclosure.

Referring to FIG. 6B, FIG. 6B is a flow chart illustrating a method for communication based on conditional PSCell change provided in implementations of the disclosure, where the method involves a terminal device, a first network node (an MN), a source second network node (a source SN), and a target second network node (a target SN). Similarly, the conditional PSCell change is classified into two types, i.e., one type is that configuration information is configured by the MN, and the other type is that configuration information is configured by the source SN. A communication method for condition PSCell change where the configuration information is configured by the source SN is exemplarily illustrated, and the method may include the following.

At S6201, the MN transmits to the terminal device resource information of multiple candidate target SNs.

A difference between conventional PSCell change and conditional PSCell change lies in that for the former, a target SN is determined from a measurement report, and for the latter, multiple candidate target SNs are determined through pre-communication, where these nodes pre-allocate access resources to the terminal device.

At S6202, the source SN transmits first configuration information to the terminal device.

The first configuration information indicates at least one measurement object and at least one cond-trigger configuration for triggering conditional PSCell change. Optionally, the first configuration information includes a measurement ID, where the measurement ID indicates at least one measurement object and at least one cond-trigger configuration. Alternatively, the first configuration information includes at least one measurement object ID and at least one cond-trigger configID, where the measurement object ID indicates a measurement object, and the cond-trigger configID indicates a cond-trigger configuration.

At 56203, the terminal device performs measurement according to the first configuration information to obtain a measurement result.

At 56204, when the measurement result meets a corresponding cond-trigger configuration, initiate a request for accessing to a target PSCell.

When the measurement result meets a configuration condition, SN addition is performed, and the target SN can return a target SN and PSCell addition acknowledge message to the MN.

When the target SN and the PSCell is successfully added, the MN can transmit a resource release request to the source SN, thereby avoiding resource waste.

At S6205, the terminal device determines a failure of access to the target PSCell.

At S6206, the terminal device transmits an SCG failure report to the MN.

The SCG failure report includes first indication information, and the first indication information indicates type information of PSCell change, where the type of PSCell change indicated is conditional or non-conventional PSCell change/addition. The SCG failure report further includes second indication information, and the second indication information indicates information for triggering conditional PSCell change. Optionally, the second indication information includes a measurement ID, where the measurement ID indicates a measurement object for triggering conditional PSCell change and a cond-trigger configuration corresponding to the measurement object, e.g., a cond-trigger configuration met by a measurement result that is obtained according to the measurement object. Alternatively, the second indication information includes a measurement object ID and a cond-trigger configID, where the measurement object ID indicates a measurement object for triggering conditional PSCell change, and the cond-trigger configID indicates a cond-trigger configuration corresponding to the measurement object.

At S6207, the MN transmits the SCG failure report to the source SN.

The source SN configures the first configuration information, therefore the source SN needs to receive the SCG failure report. The source SN releases resources connected with the terminal device, such that the source SN can receive the SCG failure report through forwarding of the MN.

At S6208, the MN modifies a condition in the SCG failure report.

At 56209, the source SN transmits second configuration information to the terminal device through the MN.

The second configuration information mainly indicates a modified triggering condition for accessing to the target PSCell. Correspondingly, the second configuration information can be transmitted to the MN first, and the MN then forwards the second configuration information to the terminal device.

At S6210, the terminal device re-initiates the request for accessing to the target PSCell.

According to the implementation, it specifically reflects that for conditional PSCell change, when the terminal device fails to access to the target PSCell, the network node can modify the information for triggering conditional PSCell change according to the first indication information and the second indication information of the terminal device, thereby improving a reliability of adjustment on the information for triggering conditional PSCell change by the network side, and thus reducing occurrence of a failure of access to a PSCell.

It can be understood that the foregoing implementations are exemplary illustration of the method for communication in the disclosure, and the description of each implementation has its own emphasis. For the parts not described in detail in a certain implementation, reference may be made to related descriptions in other implementations.

Figure 7:
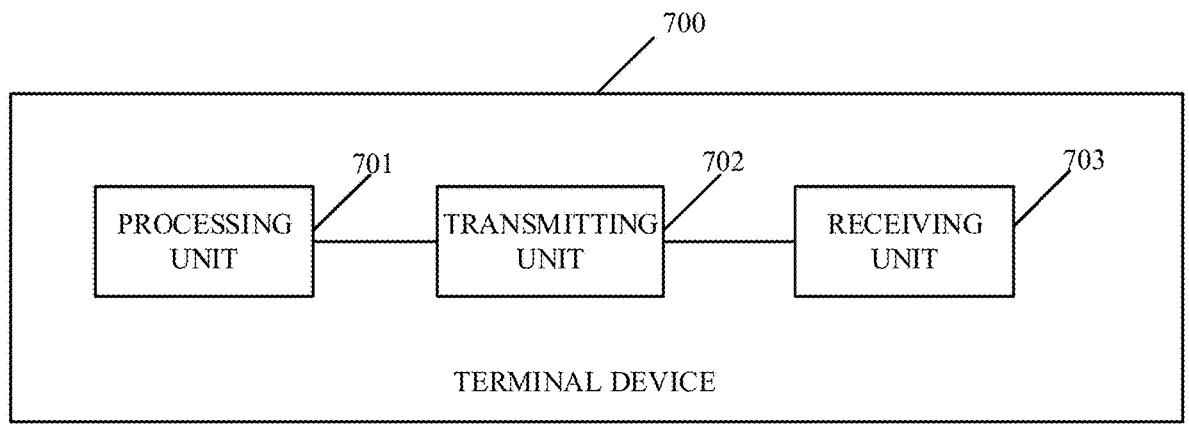
FIG. 7 is a schematic structural diagram illustrating a terminal device provided in implementations of the disclosure.

Referring to FIG. 7, FIG. 7 is a schematic structural diagram illustrating a terminal device involved in the foregoing implementations. As illustrated in FIG. 7, a terminal device 700 may include a processing unit 701 and a transmitting unit 702. These units can execute the corresponding functions of the terminal device in the foregoing method implementations. Optionally, the terminal device may further include a receiving unit 703 configured to receive related data.

The processing unit 701 may be a processor or a controller, for example, a central processing unit (CPU), a general-purpose processor, a digital signal processor (DSP), an application specific integrated circuit (ASIC), a field programmable gate array (FPGA), other programmable logic devices, transistor logic devices, hardware components, or any combination thereof. Various exemplary logical blocks, modules, and circuits described in conjunction with the disclosure may be achieved or implemented. The processor also may be a combination realizing computing functions, for example, a combination of one or more microprocessors, a combination of a DSP and a microprocessor, or the like. The transmitting unit 702 may be a transmitter, a transmitting circuit, or a communication interface. The receiving unit 703 may be a receiver, a receiving circuit, or a communication interface.

For example, the processing unit 701 is configured to determine a failure of access to a target PSCell or an RLF after the target PSCell is accessed. The transmitting unit 702 is configured to transmit an SCG failure report to a first network node, where the SCG failure report includes first indication information, and the first indication information indicates type information of PSCell addition/change.

In a possible implementation, if the first indication information indicates a type of non-conventional PSCell addition/change such as a type of CPAC, the SCG failure report further includes second indication information, and the second indication information indicates information for triggering CPAC.

In a possible implementation, the second indication information includes a measurement ID, where the measurement ID indicates a related measurement object and a related cond-trigger configuration. Alternatively, the second indication information includes a measurement object ID and a cond-trigger configID, where the measurement object ID indicates a related measurement object, and the cond-trigger configID indicates a related cond-trigger configuration.

In a possible implementation, the receiving unit 703 is configured to receive first configuration information transmitted by the first network node or a second network node, where the first configuration information indicates at least one measurement object and at least one cond-trigger configuration. If a measurement result obtained according to one of the at least one measurement object meets one of the at least one cond-trigger configuration, the transmitting unit 702 is configured to initiate a request for accessing to a target PSCell related to the measurement object.

In a possible implementation, the first configuration information includes at least one measurement ID, where the measurement ID indicates a related measurement object and a related cond-trigger configuration. Alternatively, the first configuration information includes at least one measurement object ID and at least one cond-trigger configID, where the measurement object ID indicates a measurement object, and the cond-trigger configID indicates a cond-trigger configuration.

In a possible implementation, the receiving unit 703 is further configured to receive second configuration information transmitted by the first network node or a second network node, where the second configuration information indicates modified information for triggering the PSCell addition/change. The transmitting unit is configured to access to the target PSCell according to the second configuration information.

In a possible implementation, the SCG failure report further includes third indication information, the third indication information indicates a configuration source for configuring CPAC, and the configuration source is the first network node, the second network node, a PCell, or a current serving PSCell.

In a possible implementation, the type information of PSCell addition/change is a type of conventional PSCell addition/change, a type of CPAC, or indication information indicating whether the type of PSCell addition/change is the type of CPAC or the type of conventional PSCell addition/change.

In a possible implementation, the SCG failure report further includes any one or more of: a cause of the failure of access to the target PSCell by the terminal device or a cause of the RLF after the terminal device accesses to the target PSCell, geographic location information or movement track information of the failure of access to the target PSCell by the terminal device, or measurement information of the terminal device.

Optionally, the terminal device can implement part of or all of the operations executed by the terminal device in the implementations illustrated in FIG. 2 to FIG. 6B through the foregoing units. It should be understood that, the implementations of the disclosure are apparatus implementations corresponding to the method implementations, and description for the method implementations are also applied to the implementations of the disclosure, which will not be repeated herein.

Figure 8:
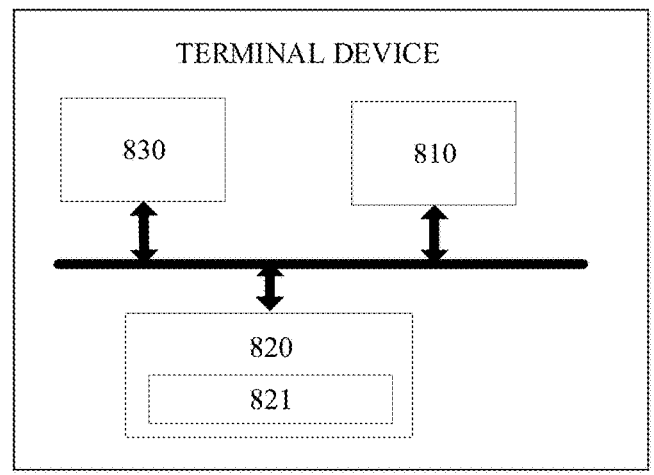
FIG. 8 is another schematic structural diagram illustrating a terminal device provided in implementations of the disclosure.

Referring to FIG. 8, FIG. 8 is another schematic structural diagram illustrating a terminal device provided in implementations of the disclosure. As illustrated in FIG. 8, the terminal device may include a processor 810, a memory 820, a communication interface 830, and one or more programs 821, where the one or more programs 821 are stored in the memory 820 and configured to be executed by the processor 810. The programs include instructions used for performing the following.

Determine a failure of access to a target PSCell or an RLF after the target PSCell is accessed. Transmit an SCG failure report to a first network node, where the SCG failure report includes first indication information, and the first indication information indicates type information of PSCell addition/change.

In a possible implementation, if the first indication information indicates a type of non-conventional PSCell addition/change such as a type of CPAC, the SCG failure report further includes second indication information, and the second indication information indicates information for triggering CPAC.

In a possible implementation, the second indication information includes a measurement ID, where the measurement ID indicates a related measurement object and a related cond-trigger configuration. Alternatively, the second indication information includes a measurement object ID and a cond-trigger configID, where the measurement object ID indicates a measurement object, and the cond-trigger configID indicates a cond-trigger configuration.

In a possible implementation, the processor 810 is further configured to receive first configuration information transmitted by the first network node or a second network node, where the first configuration information indicates at least one measurement object and at least one cond-trigger configuration. If a measurement result obtained according to one of the at least one measurement object meets one of the at least one cond-trigger configuration, the processor 810 is further configured to initiate a request for accessing to a target PSCell corresponding to the measurement object.

In a possible implementation, the first configuration information includes at least one measurement ID, where the measurement ID indicates a measurement object and a cond-trigger configuration. Alternatively, the first configuration information includes a measurement object ID and a cond-trigger configID, where the measurement object ID indicates a measurement object, and the cond-trigger configID indicates a cond-trigger configuration.

In a possible implementation, the processor 810 is further configured to receive second configuration information transmitted by the first network node or a second network node, where the second configuration information indicates modified information for triggering the PSCell addition/change. The processor 810 is further configured to access to the target PSCell according to the second configuration information.

In a possible implementation, the SCG failure report further includes third indication information, the third indication information indicates a configuration source for configuring CPAC, and the configuration source is the first network node, the second network node, a PCell, or a current serving PSCell.

In a possible implementation, the type information of PSCell addition/change is a type of conventional PSCell addition/change, a type of CPAC, or indication information indicating whether the type of PSCell addition/change is the type of CPAC or the type of conventional PSCell addition/change.

In a possible implementation, the SCG failure report further includes any one or more of: a cause of the failure of access to the target PSCell by the terminal device or a cause of the RLF after the terminal device accesses to the target PSCell, geographic location information or movement track information of the failure of access to the target PSCell by the terminal device, or measurement information of the terminal device.

Optionally, the terminal device may further include an antenna, a filter, a power management chip, or other components or structures, which will not be listed herein.

Figure 9:
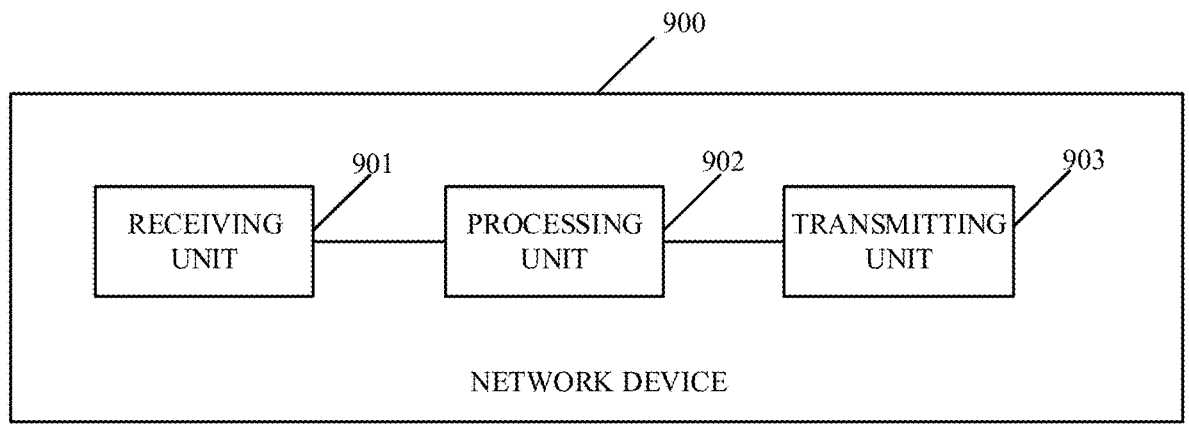
FIG. 9 is a schematic structural diagram illustrating a network device provided in implementations of the disclosure.

Referring to FIG. 9, FIG. 9 is a schematic structural diagram illustrating a network device involved in the foregoing implementations. As illustrated in FIG. 9, a network device 900 may include a receiving unit 901 and a processing unit 902. These units can execute the corresponding functions of the network node such as the first network node or the second network node in the foregoing method implementations. Optionally, the network device may further include a transmitting unit 903 configured to transmit data.

For example, the receiving unit 901 is configured to receive an SCG failure report transmitted by a terminal device, where the SCG failure report includes first indication information, and the first indication information indicates type information of PSCell addition/change. The processing unit 902 is configured to modify information for triggering PSCell addition/change according to the SCG failure report.

In a possible implementation, if the first indication information indicates a type of non-conventional PSCell addition/change such as a type of CPAC, the SCG failure report further includes second indication information, and the second indication information indicates information for triggering CPAC.

In a possible implementation, the second indication information includes a measurement ID, where the measurement ID indicates a related measurement object and a related cond-trigger configuration. Alternatively, the second indication information includes a measurement object ID and a cond-trigger configID, where the measurement object ID indicates a measurement object, and the cond-trigger configID indicates a cond-trigger configuration.

In a possible implementation, the transmitting unit 903 is configured to transmit first configuration information, where the first configuration information indicates at least one measurement object and at least one cond-trigger configuration.

In a possible implementation, the first configuration information includes at least one measurement ID, where the measurement ID indicates a measurement object and a cond-trigger configuration. Alternatively, the first configuration information includes at least one measurement object ID and at least one cond-trigger configID, where the measurement object ID indicates a measurement object, and the cond-trigger configID indicates a cond-trigger configuration.

In a possible implementation, the transmitting unit 903 is further configured to transmit second configuration information, where the second configuration information indicates modified information for triggering PSCell addition/change.

In a possible implementation, the receiving unit 901 is further configured to receive the SCG failure report forwarded by a first network node according to the third indication information.

In a possible implementation, the type information of PSCell addition/change is a type of conventional PSCell addition/change, a type of CPAC, or indication information indicating whether the type of PSCell addition/change is the type of CPAC or the type of conventional PSCell addition/change.

In a possible implementation, the SCG failure report further includes any one or more of: a cause of the failure of access to the target PSCell by the terminal device or a cause of the RLF after the terminal device accesses to the target PSCell, geographic location information or movement track information of the failure of access to the target PSCell by the terminal device, or measurement information of the terminal device.

Figure 10:
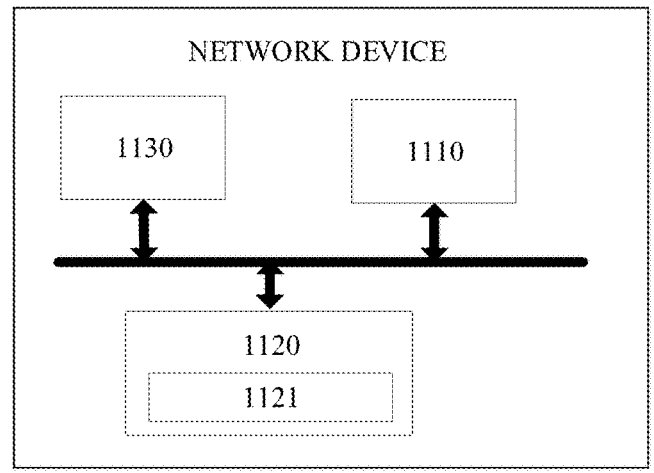
FIG. 10 is another schematic structural diagram illustrating a network device provided in implementations of the disclosure.

Referring to FIG. 10, FIG. 10 is another schematic structural diagram illustrating a network device provided in implementations of the disclosure. As illustrated in FIG. 10, the network device may include a processor 1110, a memory 1120, a communication interface 1130, and one or more programs 1121, where the one or more programs 1121 are stored in the memory 1120 and configured to be executed by the processor 1110. The programs include instructions used for performing the following.

Invoke the communication interface 1130 to receive an SCG failure report transmitted by a terminal device, where the SCG failure report includes first indication information, and the first indication information indicates type information of PSCell addition/change. Modify information for triggering PSCell addition/change according to the SCG failure report.

In a possible implementation, if the first indication information indicates a type of non-conventional PSCell addition/change such as a type of CPAC, the SCG failure report further includes second indication information, and the second indication information indicates information for triggering CPAC.

In a possible implementation, the second indication information includes a measurement ID, where the measurement ID indicates a related measurement object and a related cond-trigger configuration. Alternatively, the second indication information includes a measurement object ID and a cond-trigger configID, where the measurement object ID indicates a related measurement object, and the cond-trigger configID indicates a related cond-trigger configuration.

In a possible implementation, the processor 1110 is further configured to invoke the communication interface 1130 to transmit first configuration information to the terminal device, where the first configuration information indicates at least one measurement object and at least one cond-trigger configuration.

In a possible implementation, the first configuration information includes at least one measurement ID, where the measurement ID indicates a measurement object and a cond-trigger configuration. Alternatively, the first configuration information includes at least one measurement object ID and at least one cond-trigger configID, where the measurement object ID indicates a measurement object, and the cond-trigger configID indicates a cond-trigger configuration.

In a possible implementation, the processor 1110 is further configured to invoke the communication interface 1130 to transmit second configuration information to the terminal device, where the second configuration information indicates modified information for triggering PSCell addition/change.

In a possible implementation, the processor 1110 is further configured to invoke the communication interface 1130 to receive the SCG failure report forwarded by a first network node according to the third indication information, where the SCG failure report is transmitted from the terminal device to the first network node.

In a possible implementation, the type information of PSCell addition/change is a type of conventional PSCell addition/change, a type of CPAC, or indication information indicating whether the type of PSCell addition/change is the type of CPAC or the type of conventional PSCell addition/change.

In a possible implementation, the SCG failure report further includes any one or more of: a cause of the failure of access to the target PSCell by the terminal device or a cause of the RLF after the terminal device accesses to the target PSCell, geographic location information or movement track information of the failure of access to the target PSCell by the terminal device, or measurement information of the terminal device.

According to the implementations of the disclosure, division of functional units may be performed for the terminal device in accordance with the foregoing method examples. For example, each functional unit may be divided according to each function, and two or more functions may be integrated in one processing unit. The above-mentioned integrated unit can be implemented in the form of hardware or software program modules. It should be noted that the division of units in the implementations of the disclosure is schematic, and is merely a logical function division, and there may be other division manners in actual implementations.

It can be understood that the division of units in the implementations of the disclosure is schematic, and is merely a logical function division, and there may be other division manners in actual implementations. Various functional units described in various implementations of the disclosure may be integrated into one processing unit or may be presented as a number of physically separated units, and two or more units may be integrated into one unit. The integrated unit may be implemented by a form of hardware or a software functional unit.

A computer-readable storage medium is further provided in implementations of the disclosure. The computer-readable storage medium is configured to store computer programs used for electronic data interchange, where the computer programs enable a computer to execute part of or all of the operations performed by the terminal device or the network device (the network node) in the above-mentioned method implementations.

A computer program product is further provided in implementations of the disclosure. The computer program product includes a non-transitory computer-readable storage medium that stores computer programs. The computer programs are operable with a computer to execute part of or all of the operations performed by the terminal device in the above-mentioned method implementations. The computer program product may be a software installation package.

The algorithmic operations and the method illustrated in disclosed contents of the disclosure may be implemented as hardware, or may be implemented by a processor performing software instructions. The software instructions may be composed with corresponding software modules. The software module can be stored in a storage medium such as a random access memory (RAM), a flash memory, a read only memory (ROM), an erasable programmable ROM (EPROM), an electrically EPROM (EEPROM), a register, a hard disc, a mobile hard disc, or a compact disc read-only memory (CD-ROM), or in storage media with any other forms known in this field. An exemplary storage medium is coupled to the processor, so that the processor can read information from the storage medium and can write information to the storage medium. Of course, the storage medium can also be a part of the processor. The processor and the storage medium may be located in an ASIC. In addition, the ASIC may be located in a communication apparatus such as a terminal device. Of course, the processor and the storage medium may also be presented as discrete components in the communication apparatus.

It can be understood that the first, second, third, and various numerical numbers involved in the disclosure are only distinctions for convenience of description, and are not used to limit the scope of the implementations of the disclosure. It should be understood that, in various implementations of the disclosure, the magnitude of a sequence number of each process mentioned above does not mean an order of execution, and the order of execution of each process should be determined by its function and an internal logic and shall not constitute any limitation to an implementation process of implementations of the disclosure.

Those skilled in the art can appreciate that in the above one or more implementations, all or part of the above illustrated functions can be implemented through software, hardware, firmware, or any other combination thereof. When implemented by software, all or part of the above functions can be implemented in the form of a computer program product. The computer program product includes one or more computer instructions. When the computer program instructions are loaded and executed on a computer, all or part of the processes or functions of the implementations of the disclosure are performed. The computer can be a general-purpose computer, a special-purpose computer, a computer network, or other programmable apparatuses. The computer instructions can be stored in a computer-readable storage medium, or transmitted from one computer-readable storage medium to another computer-readable storage medium. For example, the computer instruction can be transmitted from one web site, computer, server, or data center to another web site, computer, server, or data center in a wired manner or in a wireless manner. Examples of the wired manner can be a coaxial cable, an optical fiber, a digital subscriber line (DSL), etc. The wireless manner can be, for example, infrared, wireless, microwave, etc. The computer-readable storage medium can be any computer-accessible usable-medium or a data storage device such as a server, a data center, or the like which is integrated with one or more usable media. The usable medium can be a magnetic medium (such as a soft disc, a hard disc, or a magnetic tape), an optical medium (such as a digital video disc (DVD)), or a semiconductor medium (such as a solid state disk (SSD)), etc.

What is claimed is:

1. A method for communication, comprising:
   determining, by a terminal device, a failure of access to a target primary secondary cell (PSCell) or a radio link failure (RLF) after the target PSCell is accessed; and
   transmitting, by the terminal device, a secondary cell group (SCG) failure report to a first network node,
   wherein the SCG failure report comprises first indication information, wherein the first indication information indicates whether a type of PSCell addition/change is conditional PSCell addition/change (CPAC) or conventional PSCell addition/change; and
   wherein the SCG failure report further comprises second indication information if the first indication information indicates that the type of the PSCell addition/change is the CPAC, wherein the second indication information indicates information for triggering the CPAC configured by a network device.

2. The method of claim 1, wherein:
   the second indication information comprises a measurement identity (ID), wherein the measurement ID indicates a related measurement object and a related condition-trigger (cond-trigger) configuration; or
   the second indication information comprises a measurement object ID and a condition-trigger configuration ID (cond-trigger configID), wherein the measurement object ID indicates a related measurement object, and the cond-trigger configID indicates a related cond-trigger configuration.

3. The method of claim 1, further comprising:
   receiving, by the terminal device, first configuration information transmitted by the first network node or a second network node, wherein the first configuration information indicates at least one measurement object and at least one cond-trigger configuration; and
   if a measurement result obtained by the terminal device according to one of the at least one measurement object meets one of the at least one cond-trigger configuration, initiating, by the terminal device, a request for accessing to a target PSCell related to the measurement object.

4. The method of claim 3, wherein:
   the first configuration information comprises at least one measurement ID, wherein the measurement ID indicates a related measurement object and a related cond-trigger configuration; or
   the first configuration information comprises at least one measurement object ID and at least one cond-trigger configID, wherein the measurement object ID indicates a related measurement object, and the cond-trigger configID indicates a related cond-trigger configuration.

5. The method of claim 1, wherein after transmitting, by the terminal device, the SCG failure report to the first network node, the method further comprises:
   receiving, by the terminal device, second configuration information transmitted by the first network node or a second network node, wherein the second configuration information indicates modified information for triggering PSCell addition/change; and
   accessing, by the terminal device, to the target PSCell according to the second configuration information.

6. The method of claim 1, wherein the SCG failure report further comprises third indication information, the third indication information indicates a configuration source for configuring CPAC, and the configuration source is the first network node, a second network node, a primary cell (PCell), or a current serving PSCell.

7. The method of claim 1, wherein the SCG failure report further comprises any one or more of: a cause of the failure of access to the target PSCell by the terminal device or a cause of the RLF after the terminal device accesses to the target PSCell, geographic location information or movement track information of the failure of access to the target PSCell by the terminal device, or measurement information of the terminal device.

8. A terminal device, comprising:
a transceiver;
a processor; and
a memory storing computer programs which, when executed by the processor, cause the processor to:
determine a failure of access to a target primary secondary cell (PSCell) or a radio link failure (RLF) after the target PSCell is accessed; and
the computer programs being further executed by the processor to cause the transceiver to:
transmit a secondary cell group (SCG) failure report to a first network node,
wherein the SCG failure report comprises first indication information, wherein the first indication information indicates whether a type of PSCell addition/change is conditional PSCell addition/change (CPAC) or conventional PSCell addition/change; and
wherein the SCG failure report further comprises second indication information if the first indication information indicates that the type of the PSCell addition/change is the CPAC, wherein the second indication information indicates information for triggering the CPAC configured by a network device.

9. The terminal device of claim 8, wherein:
the second indication information comprises a measurement identity (ID), wherein the measurement ID indicates a related measurement object and a related condition-trigger (cond-trigger) configuration; or
the second indication information comprises a measurement object ID and a condition-trigger configuration ID (cond-trigger configID), wherein the measurement object ID indicates a related measurement object, and the cond-trigger configID indicates a related cond-trigger configuration.

10. The terminal device of claim 8, wherein the computer programs are further executed by the processor to cause the transceiver to:
receive first configuration information transmitted by the first network node or a second network node, wherein the first configuration information indicates at least one measurement object and at least one cond-trigger configuration;
wherein the computer programs are further executed by the processor to cause the processor to initiate a request for accessing to a target PSCell related to the measurement object if a measurement result obtained by the terminal device according to one of the at least one measurement object meets one of the at least one cond-trigger configuration.

11. The terminal device of claim 10, wherein:
the first configuration information comprises at least one measurement ID, wherein the measurement ID indicates a related measurement object and a related cond-trigger configuration; or
the first configuration information comprises at least one measurement object ID and at least one cond-trigger configID, wherein the measurement object ID indicates a related measurement object, and the cond-trigger configID indicates a related cond-trigger configuration.

12. The terminal device of claim 8, wherein the computer programs are further executed by the processor to cause the processor to:
receive second configuration information transmitted by the first network node or a second network node, wherein the second configuration information indicates modified information for triggering PSCell addition/change; and
wherein the computer programs are further executed by the processor to cause the processor to access to the target PSCell according to the second configuration information.

13. The terminal device of claim 8, wherein the SCG failure report further comprises third indication information, the third indication information indicates a configuration source for configuring CPAC, and the configuration source is the first network node, a second network node, a primary cell (PCell), or a current serving PSCell.

14. A network device, comprising:
a transceiver;
a processor; and
a memory storing computer programs which, when executed by the processor, cause the transceiver to:
receive a secondary cell group (SCG) failure report transmitted by a terminal device, wherein the SCG failure report comprises first indication information, wherein the first indication information indicates whether a type of PSCell addition/change is conditional PSCell addition/change (CPAC) or conventional PSCell addition/change, and wherein the SCG failure report further comprises second indication information if the first indication information indicates that the type of the PSCell addition/change is the CPAC, wherein the second indication information indicates information for triggering the CPAC configured by the network device; and
the computer programs being further executed by the processor to cause the processor to:
modify information for triggering PSCell addition/change according to the SCG failure report.

15. The network device of claim 14, wherein:
the second indication information comprises a measurement identity (ID), wherein the measurement ID indicates a related measurement object and a related condition-trigger (cond-trigger) configuration; or
the second indication information comprises a measurement object ID and a condition-trigger configuration ID (cond-trigger configID), wherein the measurement object ID indicates a related measurement object, and the cond-trigger configID indicates a related cond-trigger configuration.

16. The network device of claim 14, wherein the computer programs are further executed by the processor to cause the transceiver to:
transmit first configuration information to the terminal device, wherein the first configuration information indicates at least one measurement object and at least one cond-trigger configuration.

17. The network device of claim 16, wherein:
the first configuration information comprises at least one measurement ID, wherein the measurement ID indicates a related measurement object and a related cond-trigger configuration; or
the first configuration information comprises at least one measurement object ID and at least one cond-trigger configID, wherein the measurement object ID indicates a measurement object, and the cond-trigger configID indicates a cond-trigger configuration.

18. The network device of claim 14, wherein the computer programs are further executed by the processor to cause the transceiver to:
transmit second configuration information to the terminal device, wherein the second configuration information indicates modified information for triggering PSCell addition/change.

19. The network device of claim 14, wherein the network device is a second network node, the SCG failure report further comprises third indication information, the third indication information indicates a configuration source for a target event, and the configuration source is the second network node, wherein the computer programs executed by the processor to cause the transceiver to receive the SCG failure report transmitted by the terminal device are executed by the processor to cause the transceiver to:
receive the SCG failure report forwarded by a first network node according to the third indication information, wherein the SCG failure report is transmitted by the terminal device to the first network node.

20. The network device of claim 14, wherein the SCG failure report further comprises any one or more of: a cause of the failure of access to the PSCell by the terminal device or a cause of a radio link failure (RLF) after the terminal device accesses to the PSCell, geographic location information or movement track information of the failure of access to the PSCell by the terminal device, or measurement information of the terminal device.

* * * * *